(12) United States Patent
Wada et al.

(10) Patent No.: US 12,379,960 B2
(45) Date of Patent: Aug. 5, 2025

(54) MANUFACTURING SCHEDULE MANAGEMENT DEVICE AND METHOD FOR RESCHEDULING MANUFACTURING PROCESS

(71) Applicants: COGNIROBO INC., Tokyo (JP); Yamada Mekki Kougyousho Co., Ltd., Nagoya (JP)

(72) Inventors: Atsushi Wada, Tokyo (JP); Irwin Joseph Howard, Tokyo (JP)

(73) Assignees: COGNIROBO INC., Tokyo (JP); Yamada Mekki Kougyousho Co., Ltd., Nagoya (JP)

( * ) Notice: Subject to any disclaimer, the term of this patent is extended or adjusted under 35 U.S.C. 154(b) by 0 days.

(21) Appl. No.: 18/647,789

(22) Filed: Apr. 26, 2024

(65) Prior Publication Data
US 2024/0345878 A1     Oct. 17, 2024

(30) Foreign Application Priority Data
Mar. 22, 2023   (JP) .................. 2023-045079

(51) Int. Cl.
G06F 9/48       (2006.01)
(52) U.S. Cl.
CPC ...... G06F 9/4881 (2013.01); *G06F 2209/486* (2013.01)
(58) Field of Classification Search
CPC .................. G06F 9/4881; G06F 2209/486
See application file for complete search history.

(56) References Cited

U.S. PATENT DOCUMENTS

| | | | | |
|---|---|---|---|---|
| 5,148,542 A | * | 9/1992 | Sakuma | G06F 9/4881 718/107 |
| 5,826,080 A | * | 10/1998 | Dworzecki | G06F 9/4887 718/103 |
| 2023/0048833 A1 | * | 2/2023 | He | G06F 9/4881 |

FOREIGN PATENT DOCUMENTS

| | | |
|---|---|---|
| CN | 115049201 A | 9/2022 |
| JP | 2020-140307 A | 9/2020 |

(Continued)

OTHER PUBLICATIONS

Office Action dated on Jun. 13, 2023 issued in the corresponding Japanese Patent Application No. 2023-045079, w/ English Translation.

*Primary Examiner* — Wissam Rashid
(74) *Attorney, Agent, or Firm* — Rimon P.C.

(57) ABSTRACT

Conventionally, it has not been possible to appropriately reschedule production tasks. With a production planning device including: a task management unit in which two or more pieces of task information each being information corresponding to one or more task attribute values are stored; a scheduling unit that performs scheduling processing to acquire schedule information that specifies a production schedule for the two or more pieces of task information based on the one or more task attribute values of each of the two or more pieces of task information; a schedule output unit that outputs the schedule information; and a rescheduling judgment unit that judges whether or not a rescheduling condition is satisfied, wherein the scheduling unit performs the scheduling processing again in a case where the rescheduling judgment unit judges that the rescheduling condition is satisfied, and the schedule output unit outputs schedule information that is a result of the scheduling processing performed again.

11 Claims, 16 Drawing Sheets

(56) References Cited

FOREIGN PATENT DOCUMENTS

| | | |
|---|---|---|
| JP | 2021-111092 A | 8/2021 |
| WO | 1998/025219 A1 | 6/1998 |
| WO | 2014/135191 A1 | 9/2014 |
| WO | 2021/250987 A1 | 12/2021 |

* cited by examiner

| TASK IDENTIFIER | TASK ATTRIBUTE VALUES ||||||| 
| | JIG IDENTIFIER | NUMBER OF HANGERS | HANG COUNT | TOTAL COUNT | ... | DEADLINE | DIFFICULTY LEVEL | ... |
| --- | --- | --- | --- | --- | --- | --- | --- | --- |
| T001 | 7-LEVEL RODS | 2 | 4 | 2 | ... | 3/3 | 3 | ... |
| T002 | 4-LEVEL RODS | 3 | 30 | 2 | ... | 3/3 | 2 | ... |
| T003 | 7-LEVEL RODS | 1 | 50 | 1 | ... | 3/5 | 3 | ... |
| T004 | 4-LEVEL RODS | 2 | 30 | 2 | ... | 3/4 | 2 | ... |
| T005 | 6-LEVEL RODS | 3 | 60 | 2 | ... | 3/3 | 3 | ... |
| T006 | 7-LEVEL RODS | 1 | 56 | 2 | ... | 3/4 | 3 | ... |
| T007 | 7-LEVEL RODS | 1 | 70 | 2 | ... | 3/6 | 4 | ... |
| T008 | 7-LEVEL RODS | 2 | 56 | 2 | ... | 3/5 | 3 | ... |
| T009 | 4-LEVEL RODS | 3 | 30 | 2 | ... | 3/3 | 2 | ... |
| ... | ... | ... | ... | ... | ... | ... | ... | ... |

FIG. 11

| ID | TASK IDENTIFIER | START TIME | END TIME | ... |
|---|---|---|---|---|
| 1 | T001 | $T_{11}$ | $T_{12}$ | ... |
| 2 | T055 | $T_{21}$ | $T_{22}$ | ... |
| 3 | T003 | $T_{31}$ | $T_{32}$ | ... |
| 4 | T006 | $T_{41}$ | $T_{42}$ | ... |
| 5 | T008 | $T_{51}$ | $T_{52}$ | ... |
| 6 | T031 | $T_{61}$ | $T_{62}$ | ... |
| ⋮ | ⋮ | ⋮ | ⋮ | ⋮ |

FIG. 12

| ID | FIXING CONDITION INFORMATION | |
|---|---|---|
| | APPLICATION CONDITION | FIXING CONDITION |
| 1 | WORKER LEVEL≤3 OR DIFFICULTY LEVEL>=4 | TASKS THAT START WITHIN 2 HOURS |
| 2 | DEFAULT | TASKS THAT START WITHIN 1 HOUR |

FIG. 13

| JIG | NUMBER OF HANGERS | HANG COUNT | TOTAL COUNT | REMAINING COUNT | TOTAL PROCESSING COUNT | START TIME | END TIME |
|---|---|---|---|---|---|---|---|
| 7-LEVEL RODS | 1 | 50 | 1 | 1 | 50 | $T_{11}$ | $T_{12}$ |
| 7-LEVEL RODS | 1 | 56 | 2 | 2 | 76 | $T_{21}$ | $T_{22}$ |
| 7-LEVEL RODS | 2 | 56 | 2 | 2 | 76 | $T_{31}$ | $T_{32}$ |
| 7-LEVEL RODS | 1 | 56 | 2 | 2 | 76 | $T_{41}$ | $T_{42}$ |
| 7-LEVEL RODS | 2 | 56 | 2 | 2 | 76 | $T_{51}$ | $T_{52}$ |
| 7-LEVEL RODS | 1 | 70 | 2 | 2 | 76 | $T_{61}$ | $T_{62}$ |
| 7-LEVEL RODS | 2 | 56 | 2 | 2 | 76 | $T_{71}$ | $T_{72}$ |
| 4-LEVEL RODS | 3 | 30 | 2 | 2 | 45 | $T_{81}$ | $T_{82}$ |
| 4-LEVEL RODS | 3 | 30 | 2 | 2 | 45 | $T_{91}$ | $T_{92}$ |
| 4-LEVEL RODS | 2 | 30 | 2 | 2 | 45 | $T_{101}$ | $T_{102}$ |
| 6-LEVEL RODS | 3 | 60 | 2 | 2 | 76 | $T_{111}$ | $T_{112}$ |
| 6-LEVEL RODS | 3 | 48 | 2 | 2 | 76 | $T_{121}$ | $T_{122}$ |

FIG. 14

MANUFACTURING SCHEDULE MANAGEMENT DEVICE AND METHOD FOR RESCHEDULING MANUFACTURING PROCESS

CROSS-REFERENCE TO RELATED APPLICATIONS

This application claims priority to Japanese Patent Application No. 2023-045079, filed on Mar. 22, 2023, and the entire contents of which are hereby incorporated by reference.

TECHNICAL FIELD

The present invention relates to a production planning device and so on that support scheduling of production tasks.

BACKGROUND ART

There is a conventional annual plan drafting device for vehicle components, allegedly capable of satisfying production on time to order, production on a priority line, and production performed in a way that reduces inventory (see Patent Document 1).

In addition, there is a conventional production plan display method allegedly capable of making it easier to grasp the cause-and-effect relationship between the production plan and the preparation plan (see Patent Document 2).

CITATION LIST

Patent Documents

Patent Document 1: JP 2020-140307A
Patent Document 2: JP 2021-111092A

SUMMARY OF THE INVENTION

Problem to be Solved by the Invention

However, with the conventional techniques, it is not possible to appropriately reschedule production tasks.

In addition, with the conventional techniques, it is difficult to determine the optimal work order and it is also difficult to display the preparation plan especially in the case of small-lot, high-mix production and in a case where new orders are provided many times a day, for example.

In addition, for example, in a case where a task called an urgent task occurs that requires the highest priority in the work order, the on-site workers may decide to cancel the production of a component or material that is still in the process of being produced, but it is difficult to handle such cases with the conventional techniques.

Means for Solving the Problems

A production planning device according to a first aspect of the present invention is a production planning device including: a task management unit in which two or more pieces of task information each being information that specifies a production task and each corresponding to one or more task attribute values are stored; a scheduling unit that performs scheduling processing to acquire schedule information that specifies a production schedule for the two or more pieces of task information based on the one or more task attribute values of each of the two or more pieces of task information; a schedule output unit that outputs the schedule information; and a rescheduling judgment unit that judges whether or not a rescheduling condition is satisfied, wherein the scheduling unit performs the scheduling processing again in a case where the rescheduling judgment unit judges that the rescheduling condition is satisfied, and the schedule output unit outputs schedule information that is a result of the scheduling processing performed again.

With such a configuration, it is possible to appropriately reschedule production tasks.

A production planning device according to a second aspect of the present invention is the production planning device according to the first aspect of the invention, wherein the rescheduling condition is a condition that a period of time longer than or equal to a certain period of time has elapsed from a start of production, a condition that a period of time longer than a certain period of time has elapsed from the start of production, or a condition that predetermined information has been accepted.

With such a configuration, it is possible to reschedule production tasks more appropriately.

A production planning device according to a third aspect of the present invention is the production planning device according to the first or the second aspect of the invention, wherein in a case where the rescheduling judgment unit judges that the rescheduling condition is satisfied, the scheduling unit fixes a schedule for one or more pieces of task information that satisfy a fixing condition, and acquires schedule information that specifies a production schedule for one or more pieces of task information that do not satisfy the fixing condition.

With such a configuration, it is possible to reschedule production tasks more appropriately by judging which tasks are to be fixed. Note that by setting the tasks to be fixed as, for example, tasks that are scheduled to start within a predetermined period of time from the current time, the worker can appropriately prepare for production.

A production planning device according to a fourth aspect of the present invention is the production planning device according to the third aspect of the invention,
wherein the fixing condition is a static fixing condition that does not change.

With such a configuration, it is possible to reschedule production tasks more appropriately by more appropriately judging which tasks are to be fixed, using the static fixing condition.

A production planning device according to a fifth aspect of the present invention is the production planning device according to the third aspect of the invention, wherein the fixing condition is a dynamic fixing condition that changes dynamically.

With such a configuration, it is possible to reschedule production tasks more appropriately by more appropriately judging which tasks are to be fixed, using the dynamic fixing condition.

A production planning device according to a sixth aspect of the present invention is the production planning device according to any one of the third to fifth aspects of the invention, including: an input acceptance unit that accepts input information from a user; and a special judgment unit that judges whether or not the input information satisfies a special condition for judging whether or not to unfix a task, wherein in a case where the special judgment unit judges that the special condition is satisfied, the scheduling unit performs the scheduling processing again on task information including the one or more pieces of task information that satisfy the fixing condition.

With such a configuration, it is possible to reschedule production tasks more appropriately by not fixing tasks in a case where the tasks satisfy a special condition.

A production planning device according to a seventh aspect of the present invention is the production planning device according to any one of the first to fifth aspects of the invention, further including: an input acceptance unit that accepts a suspension instruction corresponding to task information; and a suspension unit that performs suspension processing to suspend a task specified by the task information corresponding to the suspension instruction.

With such a configuration, it is possible to reschedule production tasks more appropriately by postponing certain tasks.

A production planning device according to an eighth aspect of the present invention is the production planning device according to any one of the first to fifth aspects of the invention, further including: an input acceptance unit that accepts an insertion instruction to insert task information into schedule information in which two or more pieces of task information are arranged; and a task generation unit that acquires one or more task attribute values of task information that is located before a position specified by the insertion instruction, acquires the task information corresponding to the one or more task attribute values, and inserts the task information into the schedule information.

With such a configuration, it is possible to easily insert new task information.

Advantageous Effect of the Invention

With a production planning device according to the present invention, it is possible to appropriately reschedule production tasks.

BRIEF DESCRIPTION OF THE DRAWINGS

FIG. 11 is a diagram showing a task management table according to the same.

FIG. 12 is a diagram showing a schedule management table according to the same.

FIG. 13 is a diagram showing a fixing condition management table according to the same.

FIG. 14 is a diagram showing an example of an output according to the same.

BEST MODE FOR CARRYING OUT THE INVENTION

Hereinafter, embodiments of a production planning device and so on with reference to the drawings. Note that in the embodiments, constituent elements with the same reference signs perform similar operations, and therefore, repeated descriptions thereof may be omitted.

First Embodiment

The present embodiment describes a production planning device that performs rescheduling in a case where there are two or more production tasks and a rescheduling condition, which is a condition for rescheduling the tasks, is satisfied.

The present embodiment also describes a production planning device that performs rescheduling while fixing the schedule for one or more tasks that match a fixing condition.

The present embodiment also describes a production planning device that unfixes tasks and performs rescheduling in a case where an input from a user matches a special condition.

The present embodiment also describes a production planning device that suspends and postpones a certain task.

Furthermore, the present embodiment describes a production planning device that, when task information is inserted, generates task information by using an attribute value of the task before the task.

Note that in the present description, the fact that information X is associated with information Y means that information Y can be acquired from information X, or that information X can be acquired from information Y, and the method for association is not limited. For example, information X and information Y may be linked or exist in the same buffer, information X may be included in information Y, or information Y may be included in information X.

Figure 1:
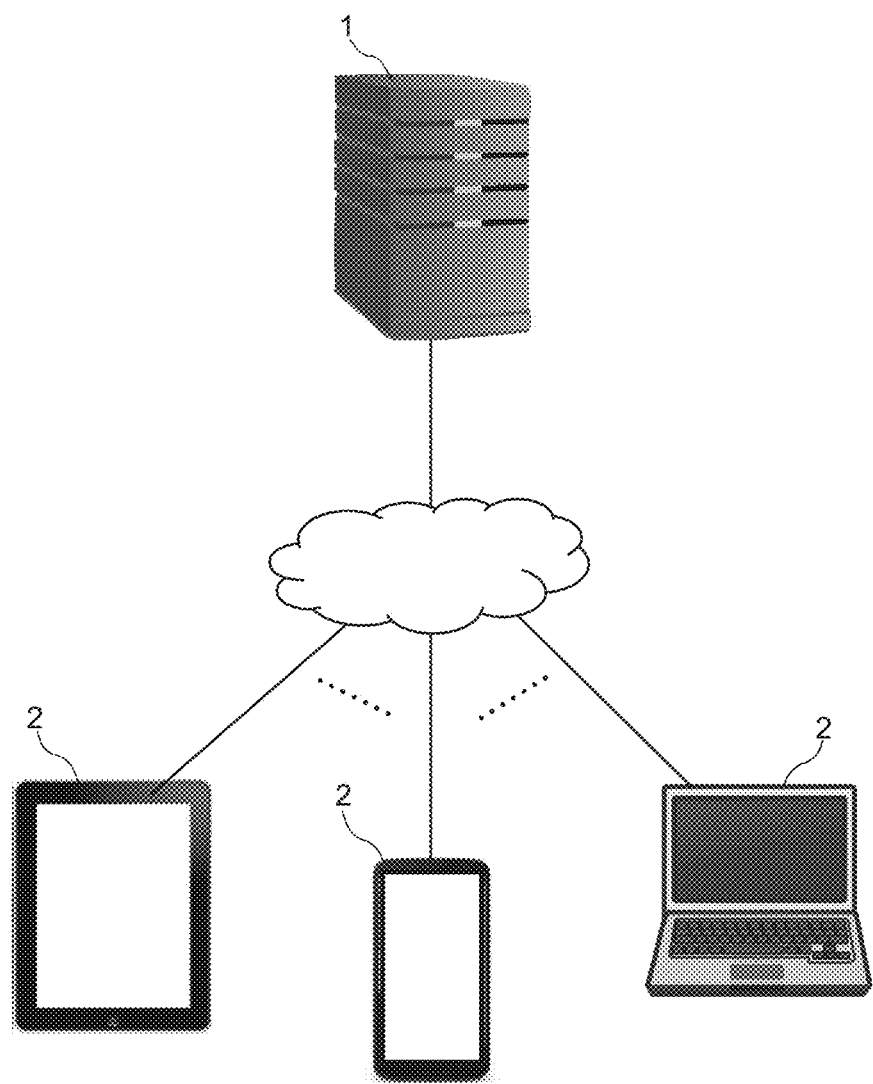
FIG. 1 is a conceptual diagram for an information system A according to a first embodiment.

FIG. 1 is a conceptual diagram for an information system A according to the present embodiment. The information system A includes a production planning device 1 and one or more terminal devices 2.

The production planning device 1 is a device that supports scheduling of two or more tasks. Each task is a task for production a product. In particular, the production planning device 1 is a scheduling support device that is effective for high-mix, low-volume production. The scheduling support device may be considered to be a device that schedules two or more tasks. The production planning device 1 is, for example, a server. The production planning device 1 is, for example, a cloud server or an ASP server, but there is no limitation on the type and installation location thereof. The production planning device 1 may be a stand-alone device. In a case where the production planning device 1 is a stand-alone device, the production planning device 1 is, for example, a mobile terminal such as a smartphone, a tablet terminal, or a mobile phone, or a personal computer, and there is no limitation on the type thereof.

Each terminal device 2 is a terminal used by a user. Each terminal device 2 is a mobile terminal such as a smartphone, a tablet terminal, or a mobile phone, or a personal computer, and there is no limitation on the type thereof.

Note that in the present specification, a product is, for example, a component of a finished product, but it may be a finished product and there is no limitation on the type thereof. A user is, for example, a production manager or a person responsible for production, but may also be a person in charge of production, and there is no limitation.

Figure 2:
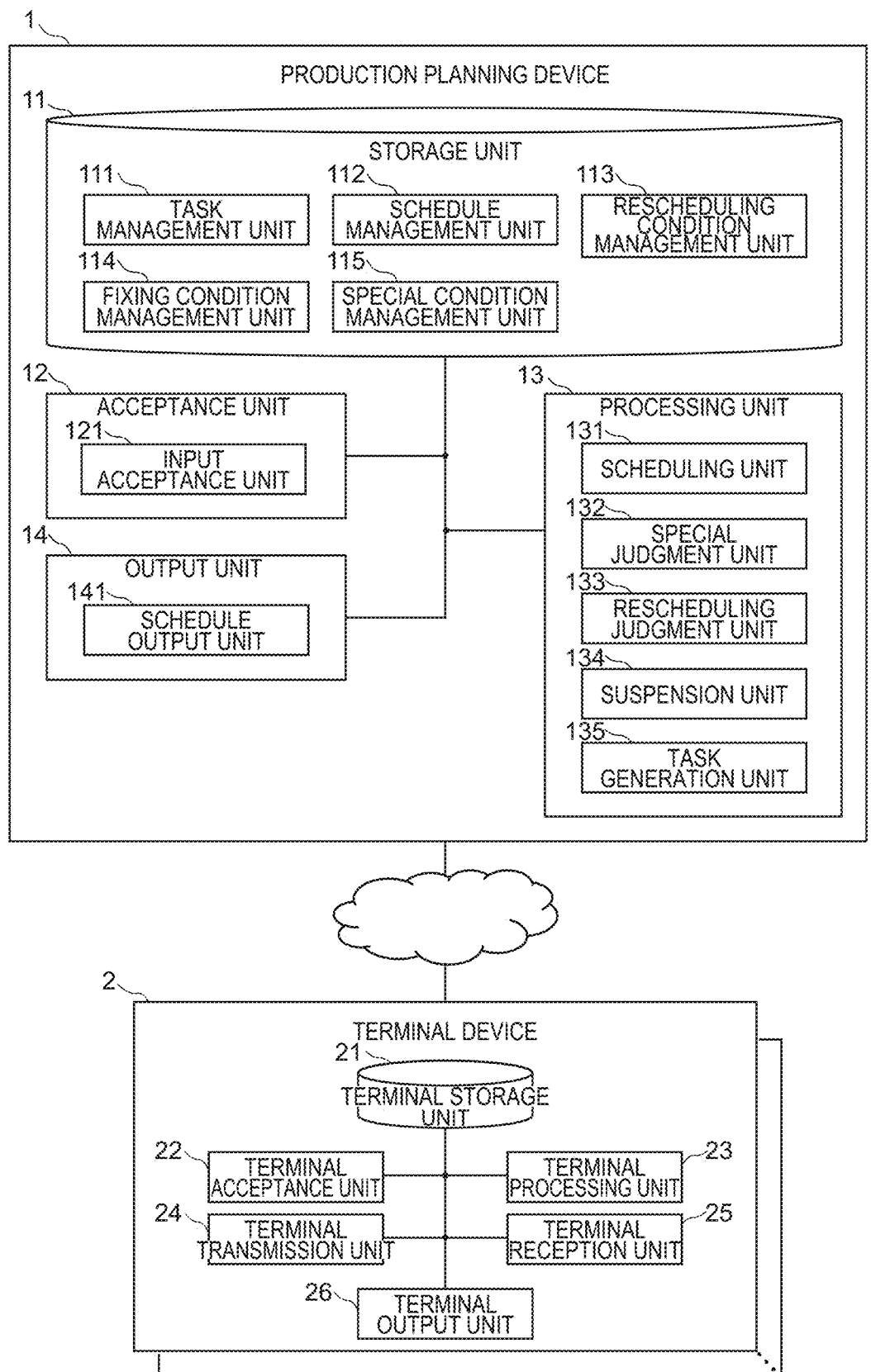
FIG. 2 is a block diagram for the information system A according to the same.

FIG. 2 is a block diagram for the information system A according to the present embodiment.

The production planning device 1 includes a storage unit 11, an acceptance unit 12, a processing unit 13, and an output unit 14. The storage unit 11 includes a task management unit 111, a schedule management unit 112, a rescheduling condition management unit 113, a fixing condition management unit 114, and a special condition management unit 115. The acceptance unit 12 includes an input acceptance unit 121. The processing unit 13 includes a scheduling unit 131, a special judgment unit 132, a rescheduling judgment unit 133, a suspension unit 134, and a task generation unit 135. The output unit 14 includes a schedule output unit 141.

The terminal device 2 includes a terminal storage unit 21, a terminal acceptance unit 22, a terminal processing unit 23, a terminal transmission unit 24, a terminal reception unit 25, and a terminal output unit 26.

The storage unit 11 included in the production planning device 1 stores various kinds of information. The various kinds of information include, for example, task information, which will be described later, schedule information, which will be described later, various conditions, which will be described later, one or more pieces of worker information, and one or more pieces of target information.

The various conditions include, for example, rescheduling conditions, fixing conditions, and special conditions. It goes without saying that conditions such as the rescheduling conditions, the fixing conditions, and the special conditions may be embedded in the program.

Worker information is information regarding workers. Workers are typically people who perform production, but may also include a production manager, an assistant, and so on. Each piece of worker information typically contains a worker identifier and one or more worker attribute values. The worker identifier is information that identifies the worker. The worker identifier is, for example, the worker's ID or the worker's name, telephone number, or email address. Worker attribute values are pieces of information that specify the worker's attributes. A worker attribute value is, for example, level information that specifies the ability of the worker. Level information may be a skill level, the number of years of work, or the like.

Target information is information regarding the target of production. The target is typically a product. Target information typically contains a target identifier and one or more target attribute values. The target identifier is information that identifies the target. The target identifier is, for example, the ID of the target or the name of the target. The target attribute values are pieces of information that specify the attributes of the target. The target attribute values are, for example, the difficulty level of producing the target and the amount and size of the target.

The task management unit 111 stores two or more pieces of task information. The task management unit 111 usually stores task information for each of two or more tasks to be scheduled. For example, each piece of task information is associated with a task identifier. Note that the task management unit 111 may be included in an external device.

Task information is information that specifies a task. Task information is information corresponding to one or more task attribute values. Corresponding to one or more task attribute values may also mean containing one or more task attribute values. A task attribute value is information regarding a task. Examples of task attribute values include a planned production quantity, a color, information indicating whether the task is an express task or not, jig information, a deadline (which may also be referred to as a delivery deadline), a time, a start time, an end time, the number of workers performing the task, and worker identifiers of the one or more workers who perform the task. Jig information is information regarding a jig used to perform the task. Jig information contains, for example, a jig identifier, a jig type, the number of hangers, and a hang count. The jig identifier is the identifier of a jig used to perform the task. The jig identifier is, for example, the name of the jig or the ID of the jig. The jig type is information indicating the type of the jig. The number of hangers is the number of hangers associated with the production line. The hang count is the number of times the target is hung on a hanger. The planned production quantity is the production quantity planned for the task. The color is the color of the production target. The deadline is the deadline for completing the task (delivery deadline). The time indicates the amount of time it takes to complete the task. The start time is the time when the task begins. The end time is the time when the task ends. The task identifier is information that identifies the task. The task identifier is, for example, the ID of the task or the name of the task.

The schedule management unit 112 stores schedule information. Schedule information is information that specifies schedules for tasks corresponding to two or more pieces of task information. Schedule information is typically information that specifies the order in which two or more tasks are to be performed. Schedule information contains, for example, a task identifier, a start time, and an end time. Schedule information may include all or some of the two or more pieces of task information. Performing a task typically means producing a target.

The rescheduling condition management unit 113 stores one or more rescheduling conditions. Each rescheduling condition is a condition for performing scheduling processing, which will be described later, again. Scheduling processing is processing performed to schedule two or more tasks. The rescheduling conditions are, for example, time conditions or information conditions. Each time condition is a condition related to time. Examples of time conditions include a condition that a period of time longer than or equal to a certain period of time has elapsed from the start of production or the previous scheduling, a condition that a period of time longer than a certain period of time has elapsed from the start of production or the previous scheduling, or every certain period of time. Each information condition is a condition related to accepted information. Examples of information conditions include a condition that predetermined information has been accepted. The predetermined information is, for example, an instruction sheet or defective product information. Note that the instruction sheet is information that describes production instructions. The instruction sheet here is typically electronic information. The instruction sheet is, for example, one or more pieces of new task information. Defective product information is information regarding defects that have occurred during production.

Note that the task information to be accepted does not have to include all the task attribute values corresponding to the task information stored in the task management unit 111.

The fixing condition management unit 114 stores one or more fixing conditions. Each fixing condition is a condition for specifying a task whose schedule is to be fixed. Each fixing condition may be a condition for specifying a task that is not to be fixed. The condition for specifying a task that is not to be fixed specifies a task that is to be fixed, and therefore it can be said that the condition for specifying a task that is not to be fixed is the condition for specifying a task that is to be fixed.

Each fixing condition is, for example, a condition that is based on one or more task attribute values, a condition that is based on one or more worker attribute values, or a condition that is based on one or more target attribute values. Each fixing condition is, for example, a static fixing condition or a dynamic fixing condition.

Astatic fixing condition is a static fixing condition that does not change. A static fixing condition is, for example, a condition that the task is started within a predetermined time from the current time, or a condition that the task is a task whose record is within a threshold from the current record. The current record is a record of the task that is currently being performed. Note that tasks that start within a predetermined time from the current time or tasks whose records are within a threshold from the current record are fixed (not subject to rescheduling) in order to give workers more time to make preparations, for example.

A dynamic fixing condition is a dynamic fixing condition that may change. A dynamic fixing condition is, for example, a condition that changes based on task attribute values, a condition that changes based on worker attribute values, or a condition that changes based on target attribute values. The condition that changes based on the task attribute values is, for example, a condition that changes based on the number of workers involved in production. The condition that changes based on the worker attribute values is, for example, a condition that changes based on a worker level. The condition that changes based on the target attribute values is, for example, a condition that changes based on the difficulty level of producing the target product.

The special condition management unit 115 stores one or more special conditions. Each special condition is a condition used to judge whether or not to unfix the task. A special condition is, for example, a condition that task information corresponding to a task attribute value indicating an express task has been accepted, or a condition that an unfixing instruction to unfix the task has been accepted from the user.

The acceptance unit 12 accepts various instructions and information. Examples of the various instructions and information include input information, which will be described later, a suspension instruction, which will be described later, an insertion instruction, which will be described later, task information corresponding to one or more task attribute values, an unfixing instruction, an instruction sheet, defective product information, a suspension cancellation instruction, which will be described later, and an output instruction. The output instruction is an instruction to output schedule information.

The "acceptance" here is typically reception of information transmitted via a wired or wireless communication network, but may be a concept that includes, for example, acceptance of information input from an input device such as a keyboard, a mouse, or a touch panel, or acceptance of information read out from a recording medium such as an optical disk, a magnetic disk, or a semiconductor memory.

The input acceptance unit 121 accepts input information. Input information is information input by a user. Examples of input information include task information corresponding to a task attribute value indicating an express task, an instruction sheet, and defective product information. Note that defective product information may be information automatically received from an external device (for example, a production device or a quality control device) rather than input information.

The input acceptance unit 121 accepts a suspension instruction. A suspension instruction is an instruction to postpone a task until a later time. A suspension instruction is associated with task information. A suspension instruction contains, for example, a task identifier.

The input acceptance unit 121 accepts a task information insertion instruction. The insertion instruction is an instruction for schedule information in which two or more pieces of task information are arranged. The insertion instruction contains information that specifies the insertion location. The information that specifies the insertion location is, for example, the task identifier of the task information before the insertion location, but there is no limitation.

The processing unit 13 performs various kinds of processing. The various kinds of processing are, for example, the processing performed by the scheduling unit 131, the special judgment unit 132, the rescheduling judgment unit 133, the suspension unit 134, and the task generation unit 135.

The processing unit 13 accumulates information accepted by the input acceptance unit 121, for example. The information is typically stored in the storage unit 11, but there is no limitation.

The scheduling unit 131 performs scheduling processing based on one or more task attribute values of each of two or more pieces of task information to be scheduled, to acquire schedule information. Note that scheduling pieces of task information means scheduling tasks. Note that the two or more pieces of task information to be scheduled are typically stored in the task management unit 111.

Scheduling processing is processing performed to acquire schedule information that specifies the production schedule for two or more pieces of task information.

The scheduling unit 131 typically performs schedule processing in time for a deadline using the one or more task attribute values of each of the two or more pieces of task information. The scheduling unit 131 performs scheduling processing, using the one or more task attribute values of each of the two or more pieces of task information so that the number of changes between the jigs to be used is reduced and/or the number of color changes of the product is reduced, for example.

The scheduling unit 131 performs scheduling processing to satisfy the following three conditions in order of priority from (1) to (3): (1) a condition that the deadlines of all the pieces of task information are met; (2) a condition that the number of changes between the jigs to be used is minimized; and (3) a condition that the number of color changes is minimized. For example, the scheduling unit 131 performs scheduling processing according to the operations shown in the flowcharts in FIGS. 5 and 6, which will be described later.

However, there is no limitation on the algorithm for the scheduling performed by the scheduling unit 131 on the two or more pieces of task information to be scheduled.

For example, the scheduling unit 131 may use a search algorithm called a metaheuristic to perform scheduling on the two or more pieces of task information and acquire schedule information. In addition, it is preferable to use an annealing method (simulated annealing) among the metaheuristics, for example. More specifically, the scheduling unit 131 may use one or more task attribute values (for example, a deadline, a production schedule, a color, information indicating whether the task is an express task or not, and jig information) of each of the two or more pieces of task information, and the number of jigs corresponding to the jig identifiers and the number of times the target can be hung on each jig stored in the storage unit 11, for example, to acquire schedule information according to a metaheuristic algorithm. Note that the schedule information here is information that specifies the order of the pieces of task information, and includes, for example, the number of products to be hung on a jig. Note that metaheuristic algorithm is a well-known technique and therefore the detailed description thereof will be omitted.

For example, the scheduling unit 131 may use a machine learning algorithm to perform scheduling on the two or more pieces of task information and acquire schedule information. The scheduling unit 131 or a learning unit (not shown) performs machine learning processing on two or more pieces of training data employing one or more task attribute values of each of the two or more pieces of task information as explanatory variables and schedule information that specifies the order of the two or more pieces of task information as an objective variable, for example, to acquire a learning model, and accumulates the learning model in the storage unit 11. The scheduling unit 131 provides the one or more task attribute values of each of the two or more pieces of task information to be scheduled and the learning model in the storage unit 11 to a prediction module that performs machine learning prediction processing, and executes the prediction module to acquire schedule information.

Note that the learning model is information formed through machine learning processing, and is information used in machine learning prediction processing. The learning model may also be referred to as a learner, classifier, classification model, or the like. The machine learning algorithm is preferably deep learning, but may be random forest, decision tree, or the like and there is no limitation. For machine learning, for example, the TensorFlow (registered trademark) library, the R language random forest module, various machine learning functions such as fastText, or various existing libraries can be used.

It is preferable that the scheduling unit 131 performs scheduling processing again in a case where the rescheduling judgment unit 133 judges that the rescheduling conditions are satisfied.

It is further preferable that in a case where the rescheduling judgment unit 133 judges that the rescheduling conditions are satisfied, the scheduling unit 131 fixes the schedule for the one or more pieces of task information that satisfy the fixing conditions, and acquires schedule information that specifies a production schedule for the one or more pieces of task information that do not satisfy the fixing conditions.

It is preferable that in a case where the special judgment unit 132 judges that the special conditions are satisfied, the scheduling unit 131 performs scheduling processing again on task information including the one or more pieces of task information that satisfy the fixing conditions.

The special judgment unit 132 judges whether or not the input information accepted by the input acceptance unit 121 satisfies the special conditions to acquire a judgment result. The judgment result is, for example, "unfix (for example, "1")" or "do not unfix (for example, "0")".

The rescheduling judgment unit 133 judges whether or not the rescheduling conditions are satisfied to acquire a judgment result. The judgment result is, for example, "perform scheduling (for example, "1")" or "do not perform scheduling (for example, "0")".

For example, the rescheduling judgment unit 133 acquires the current time from a clock (not shown), and judges whether or not the current time satisfies the time conditions. For example, in a case where the input acceptance unit 121 has accepted information, the rescheduling judgment unit 133 judges whether or not the information satisfies the information conditions. There is no limitation on the time at which the rescheduling judgment unit 133 performs the above-described judgment processing. For example, the rescheduling judgment unit 133 may perform the above-described judgment processing continuously (for example, constantly or periodically), or may perform the above-described judgment processing in a case where the input acceptance unit 121 accepts information.

It is preferable that the rescheduling judgment unit 133 judges whether or not the rescheduling conditions are satisfied while the task is being performed. Note that "while the task is being performed" typically means that production is in progress.

The suspension unit 134 performs suspension processing to suspend the task specified by the task information corresponding to a suspension instruction accepted by the acceptance unit 12. Suspension processing is, for example, processing performed to remove the task information from the schedule information. Suspension processing is, for example, performed to add a suspension flag to the task information. Suspension processing is, for example, performed to delete, from the task information, information regarding the task information corresponding to a suspension instruction (which may be the task information). Suspension processing is, for example, performed to delete, from the task information, information regarding the task information corresponding to a suspension instruction, and accumulates the task information corresponding to the suspension instruction in a predetermined buffer.

It is preferable that the suspension unit 134 performs suspension cancellation processing on the task information corresponding to a suspension cancellation instruction accepted by the acceptance unit 12 to cancel the suspension. Suspension cancellation processing is processing performed to cancel the suspension. Suspension cancellation processing is, for example, processing performed to acquire the task information to be subjected to the suspension cancellation from the buffer and add the task information to the schedule information. Suspension cancellation processing is, for example, processing performed to delete a suspension flag that is paired with the task information to be subjected to suspension cancellation. Suspension cancellation processing need only be processing performed to add the task information to be subjected to suspension cancellation to the schedule information.

The task generation unit 135 acquires one or more task attribute values of the task information at the position before the position specified by the insertion instruction, acquires the task information corresponding to the one or more task attribute values, and inserts the task information into the schedule information. For example, the task generation unit 135 acquires one or more task attribute values paired with (the task identifier included in the insertion instruction (the task identifier of the task at the position immediately before the task to be inserted) from the task management unit 111, and forms task information corresponding to the one or more task attribute values, using the one or more task attribute values, and inserts the task information into the schedule information.

The output unit 14 outputs various kinds of information. Examples of the various kinds of information include schedule information and the task information acquired by the task generation unit 135 or the like. For example, the output unit 14 outputs schedule information to one or more terminal devices 2.

Here, "output" is transmission to the terminal devices 2, but may be a concept that includes, for example, displaying on a display screen, projection using a projector, printing by a printer, the output of a sound, accumulation on a recording medium, delivery of a processing result to another processing device or another program.

The schedule output unit 141 outputs schedule information. It is preferable that the schedule output unit 141 outputs schedule information that is the result of the scheduling processing performed again.

The terminal storage unit 21 included in each terminal device 2 stores various kinds of information. Examples of the various kinds of information include task information and schedule information.

The terminal acceptance unit 22 accepts various instructions and information. Examples of the various instructions and information include task information, input information, a suspension instruction, an insertion instruction, an unfixing instruction, an instruction sheet, defective product information, a suspension cancellation instruction, and an output instruction.

The "acceptance" here is a concept that includes, for example, acceptance of information input from an input device such as a keyboard, a mouse, or a touch panel, reception of information transmitted via a wired or wireless communication network, or acceptance of information read out from a recording medium such as an optical disk, a magnetic disk, or a semiconductor memory.

Any input means, such as a touch panel, a keyboard, a mouse, a menu screen, or the like, may be employed to input various instructions and information.

The terminal processing unit 23 performs various kinds of processing. Examples of the various kinds of processing include processing performed to form the information received by the terminal reception unit 25 into data to be displayed. Examples of the various kinds of processing include processing performed to form the instruction or the like accepted by the terminal acceptance unit 22 into an instruction or the like to be transmitted.

The terminal transmission unit 24 transmits various instructions, information, or the like to the production planning device 1. Examples of the various instructions, information, or the like include an instruction formed by the terminal processing unit 23, an instruction or information accepted by the terminal acceptance unit 22, and so on.

The terminal reception unit 25 receives various kinds of information from the production planning device 1. Examples of the various kinds of information include schedule information and task information.

The terminal output unit 26 outputs various kinds of information. Examples of the various kinds of information include information accepted by the terminal acceptance unit 22, information received by the terminal reception unit 25, and information formed by the terminal processing unit 23. Examples of the various kinds of information include schedule information and task information.

It is preferable that the storage unit 11, the task management unit 111, the schedule management unit 112, the rescheduling condition management unit 113, the fixing condition management unit 114, the special condition management unit 115, and the terminal storage unit 21 are realized using a non-volatile recording medium, but they can be realized using a volatile recording medium.

There is no limitation on the process in which information is stored in the storage unit 11 or the like. For example, information may be stored in the storage unit 11 or the like via a recording medium, or information transmitted via a communication line or the like may be stored in the storage unit 11 or the like, or information input via an input device may be stored in the storage unit 11 or the like.

It is preferable that the acceptance unit 12 and the input acceptance unit 121 are realized using a wireless or wired communication means, but they may be realized using a broadcast receiving means, a device driver for an input means such as a touch panel or a keyboard, a control software for a menu screen, or the like.

The processing unit 13, the scheduling unit 131, the special judgment unit 132, the rescheduling judgment unit 133, the suspension unit 134, the task generation unit 135, and the terminal processing unit 23 can typically be realized using a processor, a memory, or the like. The processing procedures performed by the processing unit 13 and so on are typically realized using software, and the software is recorded on a recording medium such as a ROM. However, such processing procedures may be realized using hardware (a dedicated circuit). Note that the processor may be a CPU, an MPU, a GPU, or the like, and there is no limitation.

The output unit 14 and the schedule output unit 141 are typically realized using a wireless or wired communication means, but may be realized using the driver software of the output device such as a display or a speaker, the driver software of the output device and the output device, or the like.

The terminal acceptance unit 22 can be realized using a device driver for the input means such as a touch panel or a keyboard, or control software or the like for controlling the menu screen.

The terminal transmission unit 24 is typically realized using a wireless or wired communication means, but may be realized using a broadcasting means.

The terminal reception unit 25 is typically realized using a wireless or wired communication means, but may be realized using a broadcast reception means.

The terminal output unit 26 may be regarded as including or not including an output device such as a display or a speaker. The terminal output unit 26 can be realized using the driver software of the output device, the driver software of the output device and the output device, or the like. Next, an operation example of the production planning device 1 included in the information system A will be described with reference to the flowcharts in FIGS. 3 and 4.

(Step S301) The input acceptance unit 121 judges whether or not task information regarding a task planned to be performed has been accepted. If task information has been accepted, processing proceeds to step S301, and if task information has not been accepted, processing proceeds to step S303. Note that the task information accepted here is information regarding a task that has not been scheduled. In addition, in this step, the input acceptance unit 121 receives task information from the terminal device 2, for example.

(Step S302) The processing unit 13 accumulates the task information accepted in step S301 in the task management unit 111. Processing returns to step S301. Note that the accumulated task information is the task information to be scheduled later.

(Step S303) The input acceptance unit 121 judges whether or not a scheduling instruction has been accepted. If a scheduling instruction has been accepted, processing proceeds to step S304, and if a scheduling instruction has not been accepted, processing proceeds to step S306. Note that, in this step, the input acceptance unit 121 receives a scheduling instruction from the terminal device 2, for example. The input acceptance unit 121 may also accept a scheduling instruction in a case where a predetermined time is reached. That is to say, for example, scheduling processing may be started at a certain time for each day on which production is to be performed.

(Step S304) The scheduling unit 131 performs scheduling on the two or more pieces of task information in the task management unit 111. Such processing is called scheduling processing. Next, an example of scheduling processing will be described with reference to the flowchart in FIG. 5.

(Step S305) The schedule output unit 141 outputs the schedule information acquired in step S304. Processing returns to step S301. Note that, in this step, the schedule output unit 141 outputs the schedule information acquired in step S304 to the terminal device 2, for example.

(Step S306) The input acceptance unit 121 judges whether or not an output instruction has been accepted. If an output instruction has been accepted, processing proceeds to step S307, and if an output instruction has not been accepted, processing proceeds to step S309. Note that, in this step, the input acceptance unit 121 receives an output instruction from the terminal device 2, for example.

(Step S307) The processing unit 13 acquires schedule information corresponding to the output instruction from the schedule management unit 112. Next, the processing unit 13 forms schedule information to be output.

(Step S308) The schedule output unit 141 outputs the schedule information acquired in step S307. Processing returns to step S301. Note that, in this step, the schedule output unit 141 outputs the acquired schedule information to the terminal device 2, for example.

(Step S309) The input acceptance unit 121 judges whether or not information has been accepted. If information has been accepted, processing proceeds to step S310, and if information has not been accepted, processing proceeds to step S318. Note that, in this step, the input acceptance unit 121 receives information from the terminal device 2, for example.

(Step S310) The processing unit 13 accumulates the information accepted in step S309 in the storage unit 11. Note that the processing unit 13 may or may not accumulate information depending on the type of information. For example, if the information is an instruction sheet or task information, it is preferable that the processing unit 13 accumulates the information.

(Step S311) The rescheduling judgment unit 133 performs rescheduling judgment processing using the information accepted in step S309. Rescheduling judgment processing is processing performed to judge whether or not to perform rescheduling. An example of rescheduling judgment processing will be described with reference to the flowchart in FIG. 7.

(Step S312) The scheduling unit 131 judges whether the judgment result in step S311 is "perform rescheduling (for example, "1")" or "do not perform rescheduling (for example, "0")". In the case of "perform rescheduling", processing proceeds to step S313, and in the case of "do not perform rescheduling", processing proceeds to step S315.

(Step S313) The scheduling unit 131 performs scheduling again. An example of such scheduling processing will be described with reference to the flowchart in FIG. 5.

(Step S314) The schedule output unit 141 outputs the schedule information acquired in step S307. Processing returns to step S301. Note that, in this step, the schedule output unit 141 outputs the acquired schedule information to the terminal device 2, for example.

(Step S315) The special judgment unit 132 performs special judgment processing. Special judgment processing is processing performed to judge whether or not to unfix the fixed task in task scheduling. An example of special judgment processing will be described with reference to the flowchart in FIG. 8.

(Step S316) If the judgment result in step S315 is "unfix (for example, "1"), the scheduling unit 131 proceeds to step S317, and if the judgment result is "do not unfix (for example, "0"), the scheduling unit 131 returns to step S301.

(Step S317) The scheduling unit 131 turns off a fixing flag. Processing proceeds to step S313.

(Step S318) The input acceptance unit 121 judges whether or not a suspension instruction has been accepted. If a suspension instruction has been accepted, processing proceeds to step S319, and if a suspension instruction has not been accepted, processing proceeds to step S322. Note that, in this step, the input acceptance unit 121 receives a suspension instruction from the terminal device 2, for example.

(Step S319) The suspension unit 134 performs suspension processing. The suspension unit 134 deletes task information corresponding to the suspension instruction from the schedule information, and accumulates the task information in a predetermined buffer.

(Step S320) The scheduling unit 131 acquires the schedule information from which the suspended task information has been removed. Note that the scheduling unit 131 may remove the suspended task information and perform the scheduling processing in FIG. 5 using the two or more pieces of task information corresponding to the current schedule information. Such processing is rescheduling processing.

(Step S321) The schedule output unit 141 outputs the schedule information acquired in step S320. Processing returns to step S301. Note that, in this step, the schedule output unit 141 outputs the acquired schedule information to the terminal device 2, for example. Processing returns to step S301.

(Step S322) The input acceptance unit 121 judges whether or not a suspension cancellation instruction has been accepted. If a suspension cancellation instruction has been accepted, processing proceeds to step S323, and if a suspension cancellation instruction has not been accepted, processing proceeds to step S326. Note that, in this step, the input acceptance unit 121 receives a suspension cancellation instruction from the terminal device 2, for example.

(Step S323) The suspension unit 134 performs suspension cancellation processing. The suspension unit 134 performs processing to add the task corresponding to the suspended task information to the schedule. For example, the suspension unit 134 adds the suspended task information to the schedule information. For example, the suspension unit 134 instructs the scheduling unit 131 to, for example, perform scheduling processing again, using the two or more pieces of task information to which the suspended task information has been added, for example.

(Step S324) The scheduling unit 131 acquires schedule information indicating that the currently suspended task information for which suspension has been cancelled is included in the schedule. Note that the scheduling unit 131 may perform the scheduling processing in FIG. 5, using the two or more pieces of task information including the currently suspended task information for which suspension has been cancelled. Such processing is rescheduling processing.

(Step S325) The schedule output unit 141 outputs the schedule information acquired in step S324. Processing returns to step S301. Note that, in this step, the schedule output unit 141 outputs the acquired schedule information to the terminal device 2, for example. Processing returns to step S301.

(Step S326) The input acceptance unit 121 judges whether or not a task information insertion instruction has been accepted. If an insertion instruction has been accepted, processing proceeds to step S327, and if an insertion instruction has not been accepted, processing proceeds to step S335. Note that, in this step, the input acceptance unit 121 receives an insertion instruction from the terminal device 2, for example.

(Step S327) The task generation unit 135 acquires one or more task attribute values corresponding to the task information at the position immediately before the inserted task information.

(Step S328) The task generation unit 135 generates task information using the one or more task attribute values acquired in step S327.

(Step S329) The task generation unit 135 substitutes 1 for a counter i.

(Step S330) The task generation unit 135 judges whether or not the $i^{th}$ piece of task information is present in the schedule information, excluding the inserted task information. If the $i^{th}$ piece of task information is present, processing proceeds to step S331, and otherwise processing proceeds to step S333.

(Step S331) The task generation unit 135 changes one or more attribute values that are to be changed in accordance with the insertion of task information among the one or more attribute values corresponding to the $i^{th}$ task information. Note that the attribute values to be changed are the start time and the end time, for example.

(Step S332) The task generation unit 135 increments the counter i by 1. Processing returns to step S330.

(Step S333) The scheduling unit 131 acquires new schedule information into which the new task information has been inserted.

(Step S334) The schedule output unit 141 outputs the schedule information acquired in step S324. Processing returns to step S301. Note that, in this step, the schedule output unit 141 outputs the acquired schedule information to the terminal device 2, for example. Processing returns to step S301.

(Step S335) The scheduling unit 131 performs automatic rescheduling processing. Processing returns to step S301. Automatic rescheduling processing is to automatically perform rescheduling processing. An example of automatic rescheduling processing will be described with reference to the flowchart in FIG. 9.

Figure 4:
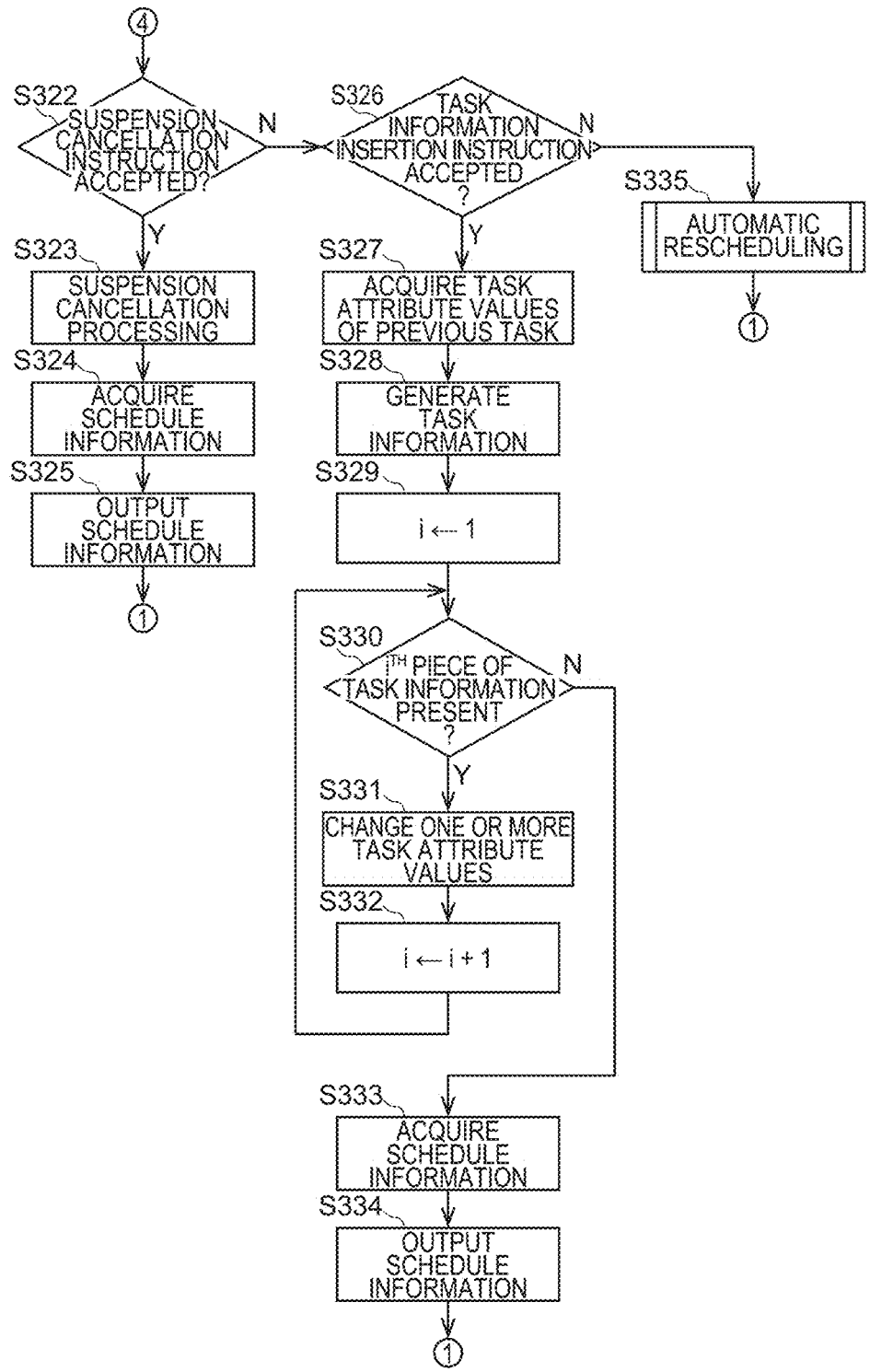
FIG. 4 is a flowchart illustrating an operation example of the production planning device 1 according to the same.

Note that, instead of the processing in steps S329 to S333 in FIG. 4, the scheduling unit 131 may fix the pieces of task information up to the inserted task information, and perform rescheduling on the two or more task information after the task information, to acquire schedule information to be output.

Figure 3:
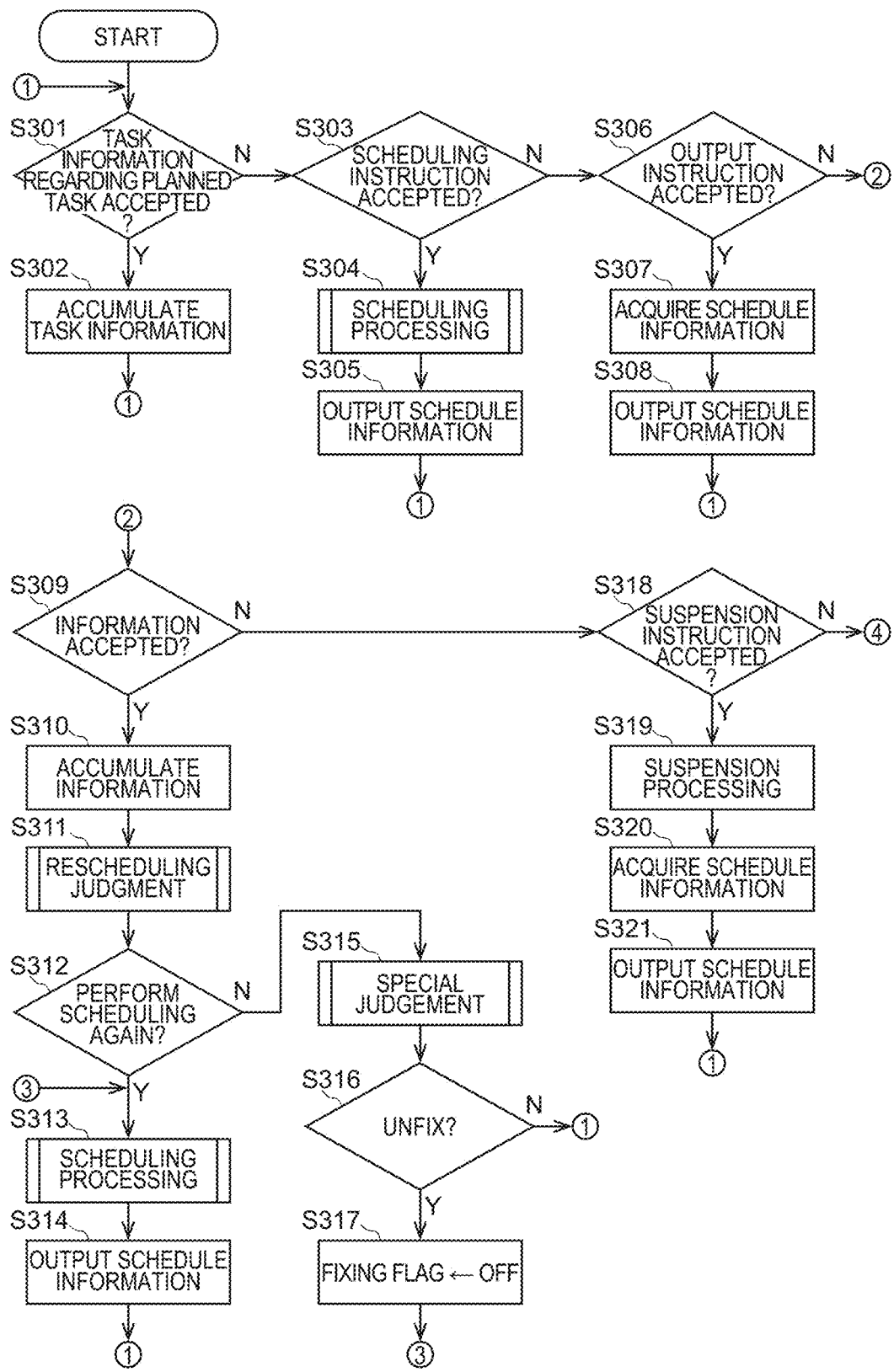
FIG. 3 is a flowchart illustrating an operation example of a production planning device 1 according to the same.

In the flowcharts in FIGS. 3 and 4, processing is terminated when power is turned off or an interruption is made to terminate the processing.

Figure 5:
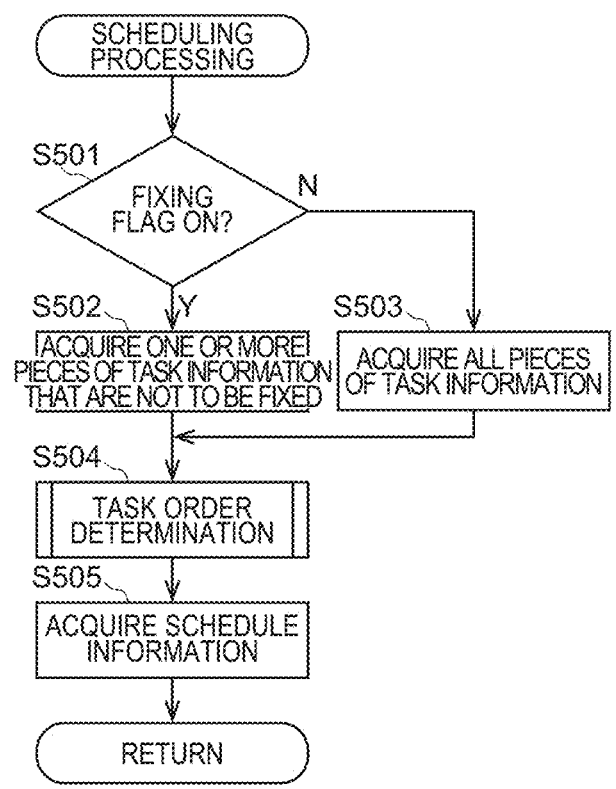
FIG. 5 is a flowchart illustrating an example of scheduling processing according to the same.

Next, an example of the scheduling processing in step S304 will be described with reference to the flowchart in FIG. 5.

(Step S501) The scheduling unit 131 judges whether the fixing flag in the storage unit 11 is on or off. If the fixing flag is on, processing proceeds to step S502, and if the fixing flag is off, processing proceeds to step S503.

(Step S502) The scheduling unit 131 acquires one or more pieces of task information that are not to be fixed from the task management unit 111 or the schedule management unit 112 based on one or more fixing conditions.

(Step S503) The scheduling unit 131 acquires all the pieces of task information to be scheduled from the task management unit 111 or the schedule management unit 112.

(Step S504) The scheduling unit 131 performs task order determination processing on the acquired two or more pieces of task information. An example of task order determination processing will be described with reference to the flowchart in FIG. 6.

(Step S505) The scheduling unit 131 acquires schedule information corresponding to the two or more pieces o task information based on the order acquired in step S504. Processing returns to higher level processing.

Next, an example of the task order determination processing in step S504 will be described with reference to the flowchart in FIG. 6.

(Step S601) The scheduling unit 131 acquires all the combinations of task orders for the acquired two or more pieces of task information. Note that in a case where the number of pieces of task information acquired is three, the number of combinations of task orders is six. A combination of task orders is appropriately referred to as a set.

(Step S602) The scheduling unit 131 substitutes 1 for the counter i.

(Step S603) The scheduling unit 131 judges whether or not the $i^{th}$ set is present. If the $i^{th}$ set is present, processing proceeds to step S604, and otherwise processing proceeds to step S614.

(Step S604) The scheduling unit 131 substitutes 1 for a counter j.

(Step S605) The scheduling unit 131 judges whether or not the $j^{th}$ piece of task information is present in the $i^{th}$ set. If the $j^{th}$ piece of task information is present, processing proceeds to step S606, and otherwise processing proceeds to step S612.

(Step S606) The scheduling unit 131 substitutes 1 for a counter k.

(Step S607) The scheduling unit 131 judges whether or not the kth essential condition is present in a case where the $i^{th}$ set is adopted. If the kth essential condition is present, processing proceeds to step S608, and otherwise processing proceeds to step S612. The essential condition is, for example, that the end time is before the deadline.

(Step S608) The scheduling unit 131 judges whether or not the $j^{th}$ piece of task information satisfies the kth essential condition. If the kth essential condition is satisfied, processing proceeds to step S609, and otherwise processing proceeds to step S610.

(Step S609) The scheduling unit 131 increments the counter k by 1. Processing returns to step S607.

(Step S610) The scheduling unit 131 increments the counter i by 1. Processing returns to step S603.

(Step S611) The scheduling unit 131 increments the counter j by 1. Processing returns to step S605.

(Step S612) The scheduling unit 131 temporarily accumulates the $i^{th}$ combination (set) of task orders in a buffer (not shown).

(Step S613) The scheduling unit 131 increments the counter i by 1. Processing returns to step S603.

(Step S614) The scheduling unit 131 substitutes 1 for the counter i.

(Step S615) The scheduling unit 131 judges whether or not the $i^{th}$ set is present in the buffer (not shown). If the $i^{th}$ set is present, processing proceeds to step S616, and otherwise processing proceeds to step S621.

(Step S616) The scheduling unit 131 substitutes 1 for the counter j.

(Step S617) The scheduling unit 131 judges whether or not the $j^{th}$ aspect for acquiring a score is present. If the $j^{th}$ aspect is present, the processing proceeds to step S618, and if the $j^{th}$ aspect is not present, processing proceeds to step S620. Note that examples of aspects include changes between jigs during production, changing colors during production, and so on.

(Step S618) The scheduling unit 131 acquires an aspect score, which is the score regarding the $j^{th}$ aspect. Note that, for example, the aspect score has a larger value for fewer changes between jigs in the schedule, and a larger value for fewer color changes in the schedule.

(Step S619) The scheduling unit 131 increments the counter j by 1. Processing returns to step S617.

(Step S620) The scheduling unit 131 acquires the score for the $i^{th}$ set, using one or more aspect scores. Note that the score has a larger value for a larger aspect score. For example, the scheduling unit 131 acquires a score that is the sum of two or more aspect scores.

(Step S621) The scheduling unit 131 increments the counter i by 1. Processing returns to step S615.

(Step S622) The scheduling unit 131 acquires the combination (set) of task orders with the best score. Note that such set constitutes schedule information.

Figure 6:
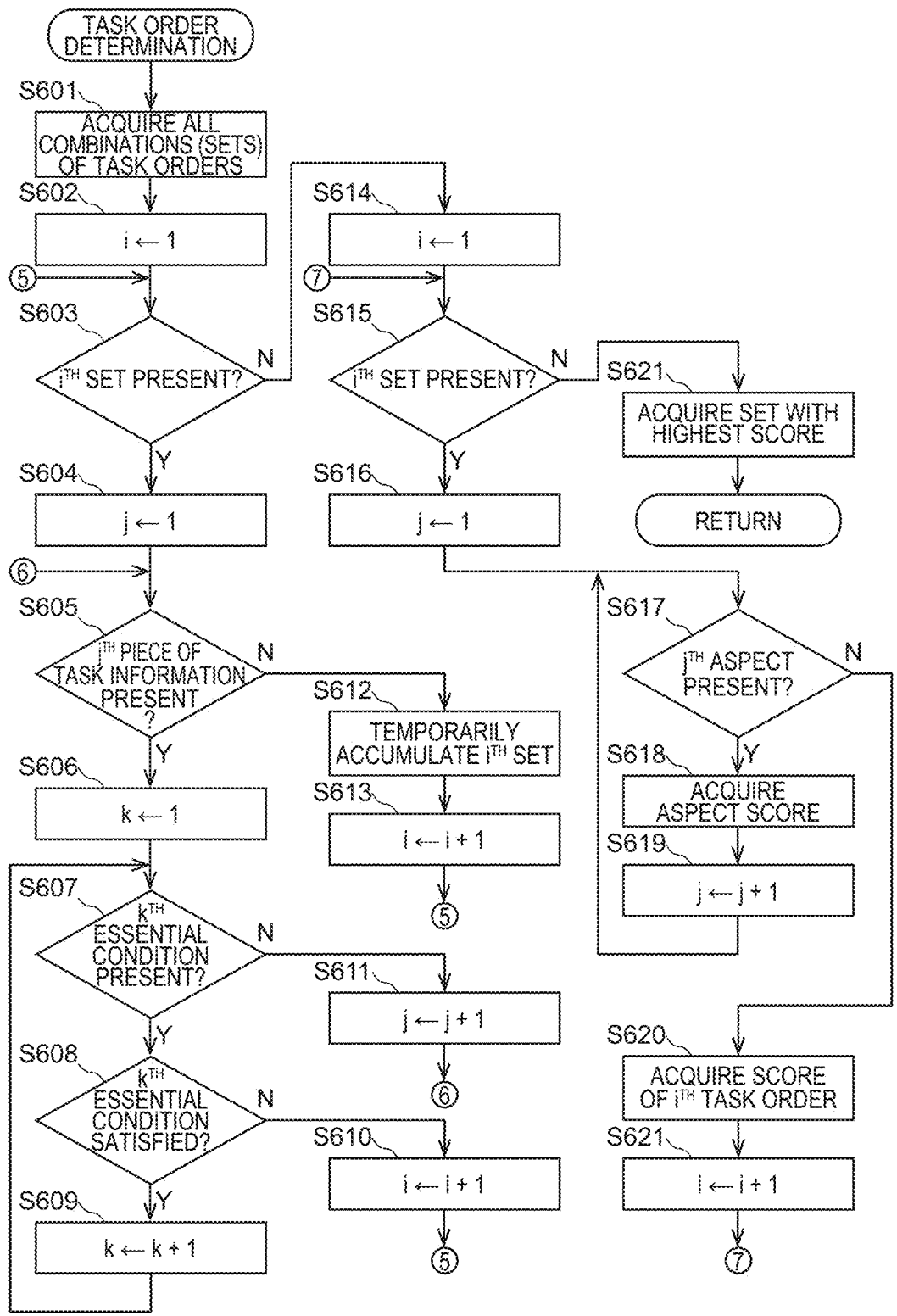
FIG. 6 is a flowchart illustrating an example of task order determination processing according to the same.

Note that, in the flowchart in FIG. 6, in a case where a combination (set) of task orders with a score equal to or higher than a threshold value is detected, the set may be adopted as the final set.

In addition, in the flowchart in FIG. 6, the scheduling unit 131 may acquire schedule information using the above-described metaheuristic algorithm or machine learning algorithm.

Figure 7:
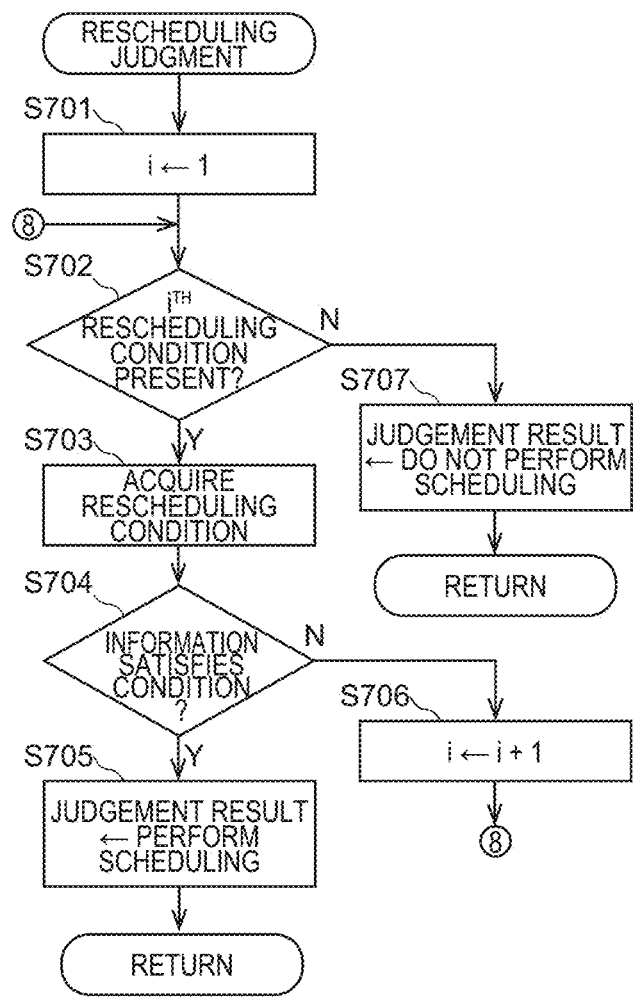
FIG. 7 is a flowchart illustrating an example of rescheduling determination processing according to the same.

Next, an example of the rescheduling processing in step S311 will be described with reference to the flowchart in FIG. 7.

(Step S701) The rescheduling judgment unit 133 substitutes 1 for the counter i.

(Step S702) The rescheduling judgment unit 133 judges whether or not the $i^{th}$ rescheduling condition is present in the rescheduling condition management unit 113. If the $i^{th}$ rescheduling condition is present, processing proceeds to step S703, and otherwise processing proceeds to step S707.

(Step S703) The rescheduling judgment unit 133 acquires the $i^{th}$ rescheduling condition from the rescheduling condition management unit 113.

(Step S704) The rescheduling judgment unit 133 judges whether or not the $i^{th}$ rescheduling condition is satisfied. If the $i^{th}$ rescheduling condition is satisfied, processing proceeds to step S705, and otherwise processing proceeds to step S706.

(Step S705) The rescheduling judgment unit 133 substitutes "perform scheduling" for the variable "judgment result". Processing returns to higher level processing.

(Step S706) The rescheduling judgment unit 133 increments the counter i by 1. Processing returns to step S702.

(Step S707) The rescheduling judgment unit 133 substitutes "do not perform scheduling" for the variable "judgment result". Processing returns to higher level processing.

Figure 8:
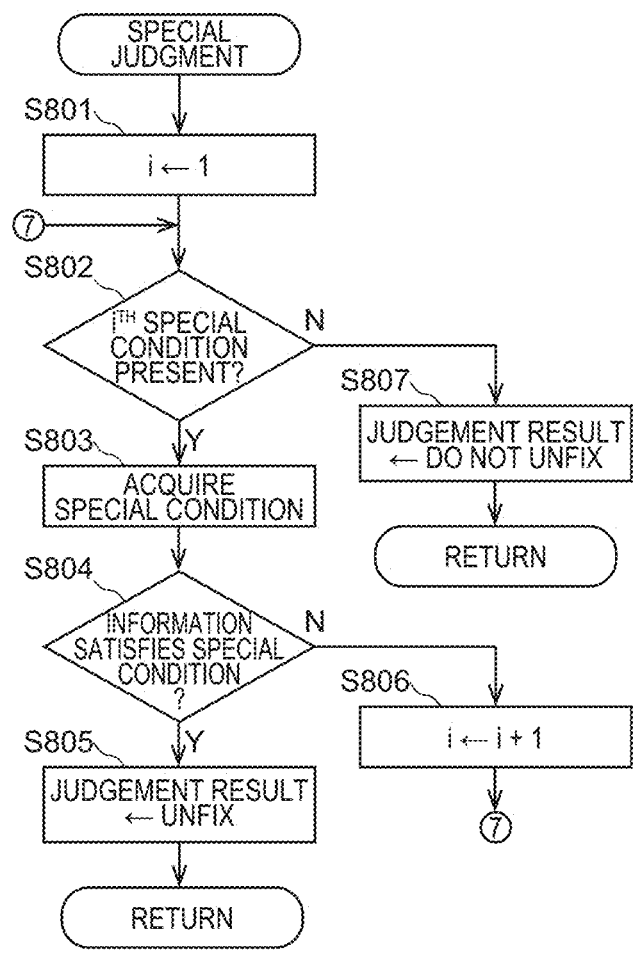
FIG. 8 is a flowchart illustrating an example of special judgment processing according to the same.

Next, an example of the special judgment processing in step S315 will be described with reference to the flowchart in FIG. 8.

(Step S801) The special judgment unit 132 substitutes 1 for the counter i.

(Step S802) The special judgment unit 132 judges whether or not the $i^{th}$ special condition is present in the special condition management unit 115. If the $i^{th}$ special condition is present, processing proceeds to step S703, and otherwise processing proceeds to step S707.

(Step S803) The special judgment unit 132 acquires the $i^{th}$ special condition from the special condition management unit 115.

(Step S804) The special judgment unit 132 judges whether or not the information accepted in step S309 satisfies the $i^{th}$ special condition. If the $i^{th}$ special condition is satisfied, processing proceeds to step S705, and otherwise processing proceeds to step S706.

(Step S805) The special judgment unit 132 substitutes "unfix" for the variable "judgment result". Processing returns to higher level processing.

(Step S806) The special judgment unit 132 increments the counter i by 1. Processing returns to step S702.

(Step S807) The special judgment unit 132 substitutes "do not unfix" for the variable "judgment result". Processing returns to higher level processing.

Figure 9:
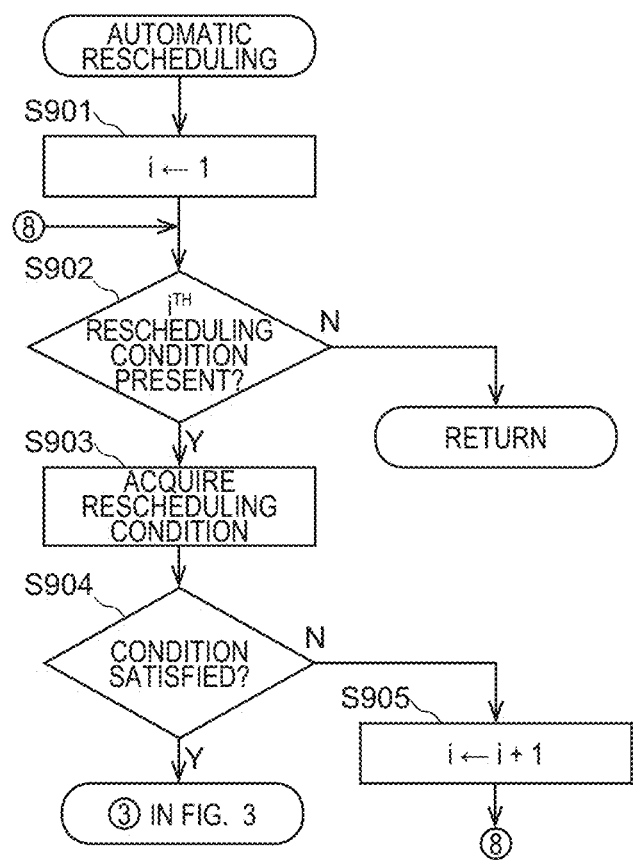
FIG. 9 is a flowchart illustrating an example of automatic rescheduling processing according to the same.

Next, an example of the automatic rescheduling processing in step S335 will be described with reference to the flowchart in FIG. 9.

(Step S901) The rescheduling judgment unit 133 substitutes 1 for the counter i.

(Step S902) The rescheduling judgment unit 133 judges whether or not the $i^{th}$ rescheduling condition is present in the rescheduling condition management unit 113. If the $i^{th}$ rescheduling condition is present, processing proceeds to step S903, and otherwise processing returns to higher level processing.

(Step S903) The rescheduling judgment unit 133 acquires the $i^{th}$ rescheduling condition from the rescheduling condition management unit 113.

(Step S904) The rescheduling judgment unit 133 judges whether or not the $i^{th}$ rescheduling condition is satisfied. If the $i^{th}$ rescheduling condition is satisfied, processing proceeds to step S313, and otherwise processing proceeds to step S905.

(Step S905) The scheduling unit 131 increments the counter i by 1. Processing returns to step S902.

Next, an operation example of a terminal device 2 will be described with reference to the flowchart in FIG. 10.

(Step S1001) The terminal acceptance unit 22 judges whether or not task information planned to be performed has been accepted. If task information has been accepted, processing proceeds to step S1002, and otherwise processing proceeds to step S1003.

(Step S1002) The terminal processing unit 23 forms the task information accepted by the terminal acceptance unit 22 into the format for transmission. The terminal transmission unit 24 transmits the task information to the production planning device 1.

(Step S1003) The terminal acceptance unit 22 judges whether or not a scheduling instruction or an output instruction has been accepted. If a scheduling instruction or an output instruction has been accepted, processing proceeds to step S1004, and otherwise processing proceeds to step S1007.

(Step S1004) The terminal processing unit 23 forms the instruction accepted by the terminal acceptance unit 22 in step S1003 into the format for transmission. The terminal transmission unit 24 transmits the instruction to the production planning device 1.

(Step S1005) The terminal reception unit 25 judges whether or not schedule information has been received. If schedule information has been received, processing proceeds to step S1006, and otherwise processing returns to step S1005.

(Step S1006) The terminal processing unit 23 forms the schedule information received by the terminal reception unit 25 into the format for output. The terminal output unit 26 outputs the schedule information. Processing returns to step S1001.

(Step S1007) The terminal acceptance unit 22 judges whether or not information (for example, an instruction sheet or defective product information) has been accepted. If information has been accepted, processing proceeds to step S1008, and otherwise processing proceeds to step S1011.

(Step S1008) The terminal processing unit 23 forms the information accepted by the terminal acceptance unit 22 in step S1007 into the format for transmission. The terminal transmission unit 24 transmits the information to the production planning device 1.

(Step S1009) The terminal reception unit 25 judges whether or not information has been received. If information has been received, processing proceeds to step S1010, and otherwise processing returns to step S1009.

(Step S1010) The terminal processing unit 23 forms the information (for example, schedule information) received by the terminal reception unit 25 into the format for output. The terminal output unit 26 outputs the information. Processing returns to step S1001.

(Step S1011) The terminal acceptance unit 22 judges whether or not a suspension instruction has been accepted. If a suspension instruction has been accepted, processing proceeds to step S1012, and otherwise processing proceeds to step S1013.

(Step S1012) The terminal processing unit 23 forms the suspension instruction accepted by the terminal acceptance unit 22 in step S1011 into the format for transmission. The terminal transmission unit 24 transmits the suspension instruction to the production planning device 1.

(Step S1013) The terminal acceptance unit 22 judges whether or not a suspension cancellation instruction has been accepted. If a suspension cancellation instruction has been accepted, processing proceeds to step S1014, and otherwise processing proceeds to step S1015.

(Step S1014) The terminal processing unit 23 forms the suspension cancellation instruction accepted by the terminal acceptance unit 22 in step S1013 into the format for transmission. The terminal transmission unit 24 transmits the suspension cancellation instruction to the production planning device 1.

(Step S1015) The terminal acceptance unit 22 judges whether or not a task information insertion instruction has been accepted. If an insertion instruction has been accepted, processing proceeds to step S1016, and otherwise processing proceeds to step S1017.

(Step S1016) The terminal processing unit 23 forms the insertion instruction accepted by the terminal acceptance unit 22 in step S1015 into the format for transmission. The terminal transmission unit 24 transmits the insertion instruction to the production planning device 1.

(Step S1017) The terminal reception unit 25 judges whether or not schedule information has been received. If schedule information has been received, processing proceeds to step S1006, and otherwise processing returns to step S1001.

Figure 10:
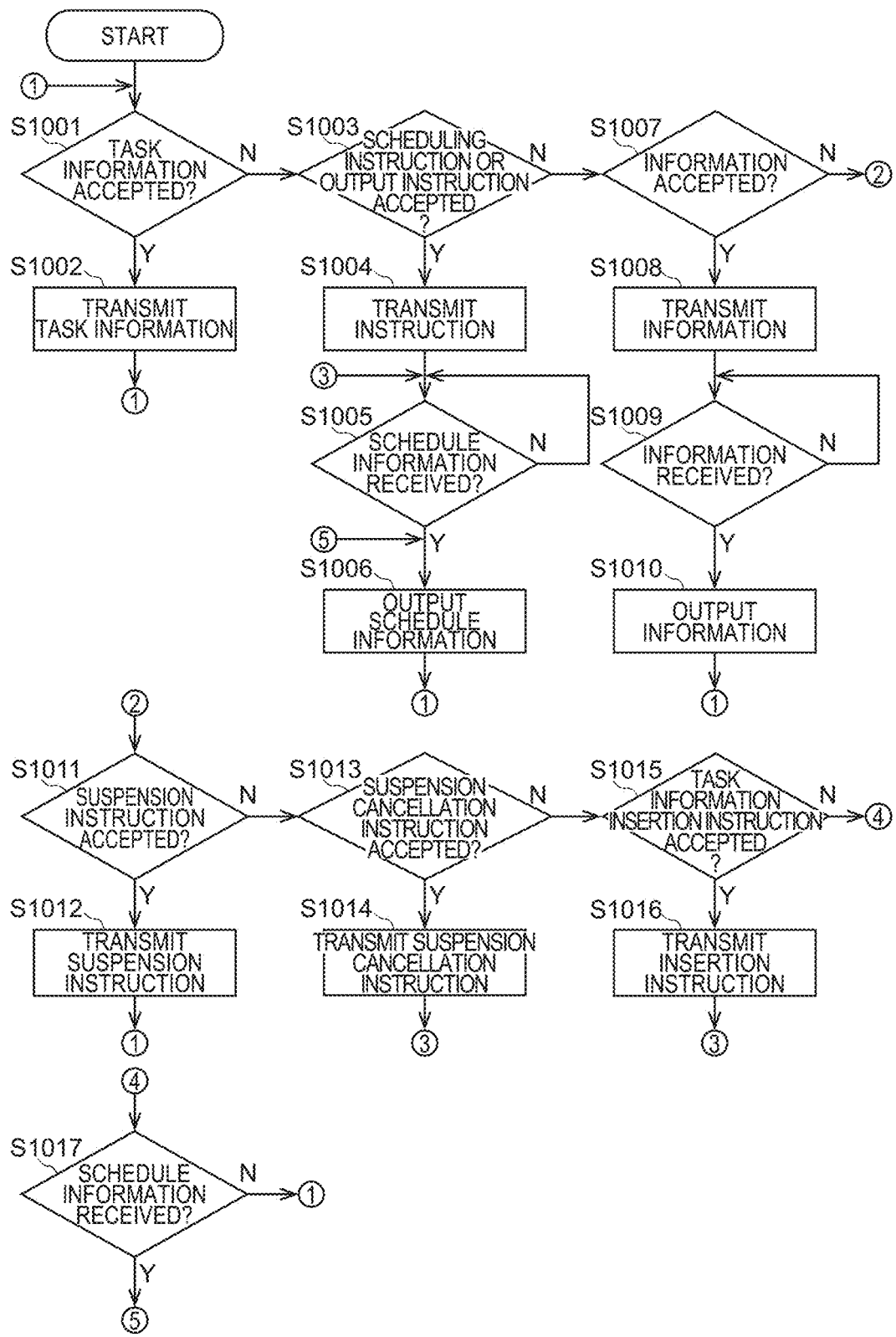
FIG. 10 is a flowchart illustrating an operation example of a terminal device 2 according to the same.

Note that, in the flowchart in FIG. 10, processing is terminated when power is turned off or an interruption is made to terminate the processing.

Hereinafter, examples of specific operations of the information system A according to the present embodiment will be described. It is now assumed that today's worker level "3" is stored in the storage unit 11 of the production planning device 1. The storage unit 11 also stores, for example, the quantity of jigs for each jig identifier (the type of jig) and the specifications of the jig for each jig identifier (for example, the number of times the production target can be hung).

In addition, the task management unit 111 stores a task management table, which is shown in FIG. 11. The task management table is a table for managing one or more pieces of task information. The task management table is a collection of pieces of task information transmitted from the terminal device 2 and accumulated in the task management unit 111. The task information in the task management unit 111 is task information to be scheduled. The task management table stores a large number of records each containing a task identifier and a task attribute value. The task attribute values include "jig identifier", "number of hangers", "hang count", "total count", "deadline", and "difficulty level".

The schedule management unit 112 stores a schedule management table having the structure shown in FIG. 12. The schedule management table is a table that specifies the order in which tasks are performed. The schedule management table stores two or more records each containing "ID", "task identifier", "start time", and "end time". Each record corresponds to one task. The "ID" is information identifying a record. The "start time" is the scheduled time to start the task, and the "end time" is the scheduled time to end the task. Each record may contain one or more task attribute values.

The rescheduling condition management unit 113 stores, for example, rescheduling conditions such as a time condition "every two hours" and an information condition "an instruction sheet has been accepted".

The fixing condition management unit 114 stores a fixing condition management table, which is shown in FIG. 13. The fixing condition management table stores two or more records each containing "ID" and "fixing condition information". The "fixing condition information" contains "application condition" and "fixing condition". The "application condition" is a condition for applying the fixing condition. The fixing condition information with "ID=1" indicates that in a case where the worker level is 3 or lower, or in a case where the difficulty level of the task planned to be fixed is 4 or higher, tasks that start within 2 hours from the current time are to be fixed. The fixing condition information with "ID=2" indicates that in a case where the application condition with "ID=1" is not satisfied, tasks that start within one hour from the current time are to be fixed. Note that, as described above, in a case where any of the special conditions is satisfied, the fixing conditions are not to be applied. It is preferable that tasks planned to start within a predetermined period of time from the current time are fixed because this gives the worker time to make preparations.

It is assumed that the special condition management unit 115 stores information indicating that "task information including the task attribute value "express" has been accepted" and "an unfixing instruction has been accepted". The information indicating that "an unfixing instruction has been accepted" indicates that a fixed task is to be unfixed in a case where an unfixing instruction is accepted.

It is assumed that the worker inputs a scheduling instruction to the terminal device 2 before starting production for today (for example, 2 March). Next, the terminal device 2 accepts the scheduling instruction and transmits the scheduling instruction to the production planning device 1.

In such a situation, the following five specific examples will be described. Specific Example 1 is an example of scheduling processing, and an example of scheduling in which the fixed task is explicitly indicated. Specific Example 2 is a case where scheduling is performed again in a case where the accepted information satisfies a rescheduling condition during production. Specific Example 3 is a case where a fixed task is unfixed and rescheduled in a case where a special condition is satisfied. Specific Example 4 is a case where the worker inputs a suspension instruction. Specific Example 5 is a case where the worker inputs a suspension instruction.

Specific Example 1

Next, the input acceptance unit 121 of the production planning device 1 receives a scheduling instruction. Next, the scheduling unit 131 acquires schedule information according to the above-described algorithm (for example, the processing in FIGS. 5 and 6), using the task attribute values in the task management table (FIG. 11).

Next, the scheduling unit 131 writes the acquired schedule information into the schedule management table. Such schedule information is the schedule management table in FIG. 12.

Next, the scheduling unit 131 forms schedule information to be transmitted, using the schedule management table in FIG. 12 and the task management table in FIG. 11. Next, the schedule output unit 141 transmits the formed schedule information to the terminal device 2.

Next, the terminal device 2 receives and outputs the schedule information. The worker performs work according to such schedule information.

It is assumed that according to the schedule information, the current time is "$T_{11}$" and the worker has started production. The rescheduling judgment unit 133 determines the piece of task information to be fixed in the following manner. That is to say, the rescheduling judgment unit 133 reads out the today's worker level "3" in the storage unit 11. The rescheduling judgment unit 133 judges that the application condition for "ID=1" in the fixing conditions management table (FIG. 13) is satisfied, and acquires the fixing condition for "ID=1". Next, the rescheduling judgment unit 133 acquires the current time. Next, the rescheduling judgment unit 133 determines that the task information that is to be started within two hours from the current time is the information to be fixed. Next, the scheduling unit 131 acquires schedule information in which the tasks to be fixed are explicitly indicated. Next, the schedule output unit 141 transmits the schedule information to the terminal device 2.

Next, the terminal device 2 receives and outputs the schedule information. An example of such an output is shown in FIG. 14. In FIG. 14, a boundary line 1401 is drawn between the tasks to be fixed and the tasks not to be fixed. That is to say, the tasks in a range 1402 are the fixed tasks. The tasks in a range 1403 are the tasks to be scheduled when scheduling is performed again. Note that there is no limitation on the method for making the worker aware of the tasks to be fixed. For example, the background color of the tasks to be fixed may be different from the background color of the tasks not to be fixed. However, it is preferable that the tasks to be fixed and the tasks not to be fixed are visually distinguishable.

In addition, it is preferable that the terminal device 2 outputs the task currently being performed in a manner distinguishable from the other tasks in FIG. 14. The task indicated by the reference sign 1404 is currently being performed.

Specific Example 2

It is assumed that, after the start of production, during production, the input acceptance unit 121 of the production planning device 1 receives one or more new pieces of task information from the terminal device 2, and the processing unit 13 accumulates the pieces of task information in the task management unit 111.

It is assumed that two hours have elapsed from the start of the work. The rescheduling judgment unit 133 acquires the time condition "every two hours" from the rescheduling condition management unit 113. Next, the scheduling unit 131 acquires the latest scheduling time and the current time, and judges that two hours have elapsed. That is to say, the rescheduling judgment unit 133 judges that scheduling is to be performed again.

Next, the scheduling unit 131 performs scheduling again as follows. That is to say, the scheduling unit 131 judges that the fixing flag in the storage unit 11 is on, which is the default value. Next, the scheduling unit 131 acquires task information regarding tasks excluding the tasks to be fixed whose start time, which is a task attribute value, is within two hours from the current time, from the task management table (FIG. 11). Next, the scheduling unit 131 performs task order determination processing (for example, the processing expressed by the flowchart in FIG. 6) on the two or more pieces of task information thus acquired, to acquire schedule information. Next, the schedule output unit 141 transmits the acquired schedule information to the terminal device 2.

Next, the terminal device 2 receives and outputs the schedule information. An illustration of such an output is shown in FIG. 14. The line (1401) that explicitly indicate the fixed tasks is present in the output schedule information.

In this specific example, one or more certain tasks were fixed, and scheduling was performed again on tasks that were not fixed. Additionally, the tasks were rescheduled when necessary. As a result, the worker can acquire schedule information that is appropriate to the situation in which tasks frequently change.

Specific Example 3

It is assumed that an express task has been received and therefore the worker inputs task information that contains the task attribute value "express" into the terminal device 2. The terminal device 2 receives the task information and transmits the task information to the production planning device 1.

The input acceptance unit 121 of the production planning device 1 receives the task information containing the task attribute value "express". Next, the processing unit 13 accumulates the task information in the task management table. Next, the special judgment unit 132 judges that the task information containing the task attribute value "express" satisfies a special condition. This special condition is that "task information containing the task attribute value "express" has been accepted".

Next, the scheduling unit 131 turns off the fixing flag. Thereafter, the scheduling unit 131 acquires all of the two or more pieces of task information that have not been performed, including the received task information. Next, the scheduling unit 131 performs the above-described scheduling processing on the two or more pieces of task information thus acquired, to acquire schedule information. The scheduling processing is the processing described with reference to FIGS. 5 and 6, for example. Note that using all of the two or more task information that have not been performed means that there is no task information to be fixed.

Next, the schedule output unit 141 transmits the acquired schedule information to the terminal device 2.

Next, the terminal device 2 receives and outputs the schedule information.

As described above, in this specific example, the tasks are unfixed and scheduled again.

Specific Example 4

It is assumed that the list of tasks shown in FIG. 14 is now displayed on the worker's terminal device 2.

It is assumed that the worker inputs an "suspension instruction" for the line (task) indicated by the reference sign 1405 in FIG. 14. Note that there is no limitation on the method for inputting the suspension instruction. For example, although not shown in the figure, the worker inputs a suspension instruction by ticking the line indicated by the reference sign 1405 in FIG. 14 and designating a "suspension" button. It is assumed that such a suspension instruction contains a task identifier "T008" of the task indicated by the reference sign 1405.

Next, the terminal acceptance unit 22 accepts the suspension instruction containing the task identifier "T008" and transmits the suspension instruction to the production planning device 1.

Next, the input acceptance unit 121 of the production planning device 1 receives the suspension instruction. Next, the suspension unit 134 performs suspension processing. That is to say, the suspension unit 134 excludes the task information corresponding to the task identifier "T008" from the schedule information. In addition, the suspension unit 134 accumulates the task information corresponding to the task identifier "T008" in a predetermined buffer that is a buffer for storing suspended task information. Thereafter, the scheduling unit 131 acquires two or more pieces of task information to be scheduled, excluding the task information corresponding to the task identifier "T008". Next, the scheduling unit 131 performs scheduling processing again on the two or more pieces of task information thus acquired, to acquire schedule information. The scheduling processing is the processing described with reference to FIGS. 5 and 6, for example. Note that here the scheduling unit 131 acquires schedule information in which the tasks to be fixed have been changed. Next, the schedule output unit 141 transmits the schedule information to the terminal device 2.

Next, the terminal device 2 receives and outputs the schedule information. Such schedule information is the schedule information in FIG. 14 without the line indicated by the reference sign 1405. In the output of the schedule information, the tasks to be fixed are changed compared to FIG. 14.

In this specific example, certain task information can be suspended according to changes in the situation during production, for example.

Specific Example 5

It is assumed that the list of tasks shown in FIG. 14 is now displayed on the worker's terminal device 2.

It is assumed that the worker is performing the work indicated by the reference sign 1406. It is assumed that the worker has only completed the hang count of "50" out of the hang count of "56" in the period in which the work indicated by the reference sign 1406 is to be performed.

It is assumed that the worker inputs a task information insertion instruction so that new task information is inserted below the task indicated by the reference sign 1406 in FIG. 14. Next, the terminal acceptance unit 22 of the terminal device 2 accepts the task information insertion instruction. This insertion instruction contains the task identifier "T006" of the task information indicated by the reference sign 1406. Next, the terminal transmission unit 24 transmits the insertion instruction containing the task identifier "T006" to the production planning device 1. Note that the task information to be inserted is the task information to be inserted immediately after the task information with the task identifier "T006".

Next, the input acceptance unit 121 of the production planning device 1 receives the insertion instruction. Next, the task generation unit 135 acquires one or more task attribute values paired with the task identifier "T006" contained in the insertion instruction, from the task management table (FIG. 11). The task identifier "T006" is information identifying the task immediately before the task to be newly generated.

Next, the task generation unit 135 generates new task information, using the one or more task attribute values acquired.

Next, the scheduling unit 131 acquires new schedule information into which the newly generated task information has been inserted. Next, the schedule output unit 141 transmits the acquired schedule information to the terminal device 2.

Next, the terminal device 2 receives and outputs the schedule information. This schedule information is the schedule information shown in FIG. 14 to which a line containing the same task attribute values as the line 1406 is added after the line 1406. Thereafter, the worker changes the task attribute values of the added line (task information) as necessary. Here, it is assumed that the worker changes the hang count of the added line (task information) to the hang count "6", which is not complete.

In this specific example, new task information can be easily added in accordance with the production situation.

As described above, according to the present embodiment, it is possible to appropriately reschedule production tasks.

In addition, according to the present embodiment, it is possible to reschedule production tasks more appropriately by fixing some tasks. More specifically, by fixing some tasks, it is possible to appropriately reschedule production tasks while giving the worker time to make preparations, for example.

In addition, according to the present embodiment, it is possible to reschedule production tasks more appropriately by judging which tasks are to be fixed, using static fixing conditions or dynamic fixing conditions.

In addition, according to the present embodiment, it is possible to reschedule production tasks more appropriately by not fixing tasks in a case where the tasks satisfy a special condition.

In addition, according to the present embodiment, it is possible to reschedule production tasks more appropriately by postponing (suspending) certain tasks.

Furthermore, according to the present embodiment, new task information can be easily inserted.

Note that in the present embodiment, the production planning device 1 may be a stand-alone device. In such a case, the acceptance unit 12 and the input acceptance unit 121 typically accept information and instructions from a worker or the like. The output unit 14 and the schedule output unit 141 typically output information such as schedule information to a display.

The processing in the present embodiment may be realized using software. This software may be distributed through software downloading or the like. Also, this software may be recorded on a recording medium such as a CD-ROM and distributed. Note that the same applies to the other embodiments in the present description. Note that the software that realizes the information system A according to the present embodiment is the program described below. That is to say, this program enables a computer that can access a task management unit in which two or more pieces of task information each being information that specifies a production task and each corresponding to one or more task attribute values are stored, to function as: a scheduling unit that performs scheduling processing to acquire schedule information that specifies a production schedule for the two or more pieces of task information based on the one or more task attribute values of each of the two or more pieces of task information; a schedule output unit that outputs the schedule information; and a rescheduling judgment unit that judges whether or not a rescheduling condition is satisfied, wherein the scheduling unit performs the scheduling processing again in a case where the rescheduling judgement unit judges that the rescheduling condition is satisfied, and the schedule output unit outputs schedule information that is a result of the scheduling processing performed again.

Figure 15:
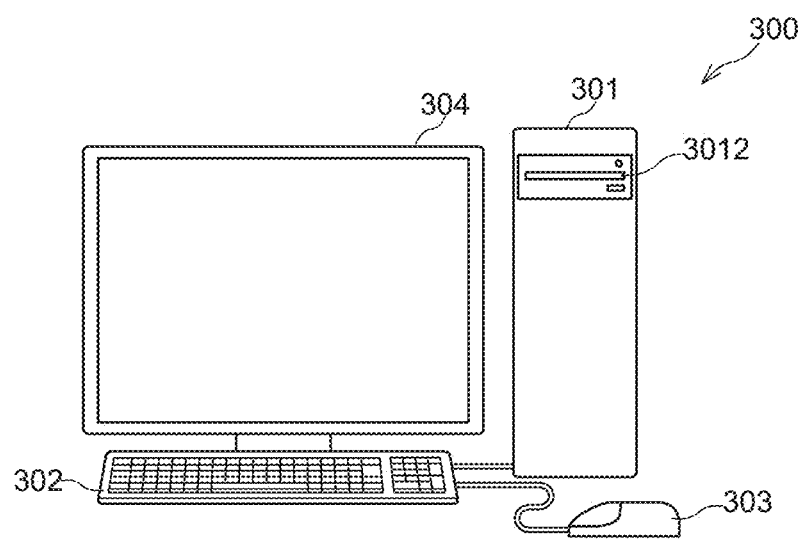
FIG. 15 is an overview of a computer system according to the same.

FIG. 15 shows an external appearance of a computer that executes the program described in the present specification and realizes the production planning device 1 and so on according to the various embodiments described above. The above-described embodiments can be realized using computer hardware and a computer program executed thereon. FIG. 15 is an overview diagram for this computer system 300, and FIG. 16 is a block diagram for the system 300.

In FIG. 15, the computer system 300 includes a computer 301 that includes a CD-ROM drive, a keyboard 302, a mouse 303, and a monitor 304.

Figure 16:
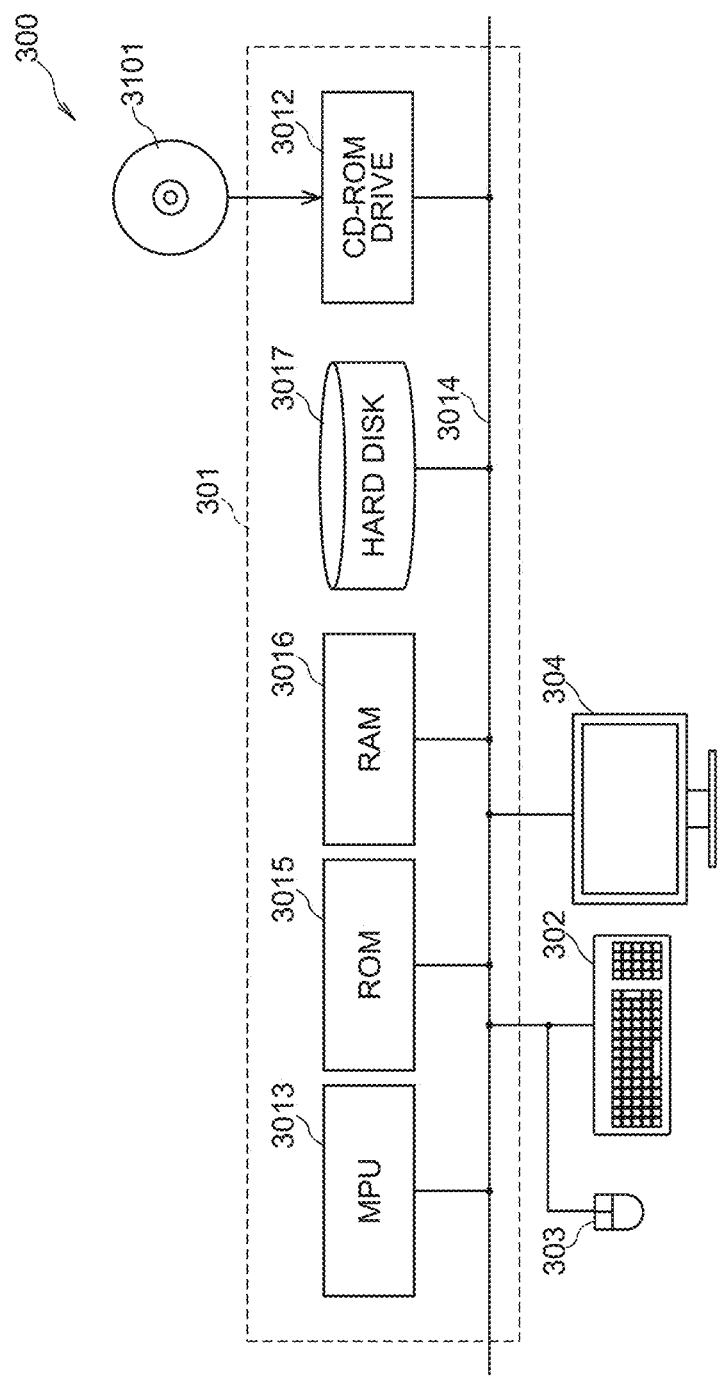
FIG. 16 is a block diagram for the computer system according to the same.

In FIG. 16, the computer 301 includes, in addition to the CD-ROM drive 3012, an MPU 3013, a bus 3014 that is connected to the CD-ROM drive 3012 and so on, a ROM 3015 for storing programs such as a boot-up program, a RAM 3016 that is connected to the MPU 3013 and is used to temporarily store application program instructions and provide a temporary storage space, and a hard disk 3017 for storing application programs, system programs, and data.

Here, although not shown in the figure, the computer 301 may further include a network card that provides connection to a LAN.

The program that enables the computer system 300 to perform the functions of the production planning device 1 and so on according to the above-described embodiments may be stored in the CD-ROM 3101, inserted into the CD-ROM drive 3012, and furthermore transferred to the hard disk 3017. Alternatively, the program may be transmitted to the computer 301 via a network (not shown) and stored on the hard disk 3017. The program is loaded into the RAM 3016 when the program is to be executed. The program may be directly loaded from the CD-ROM 3101 or the network.

The program does not necessarily have to include an operating system (OS), a third party program, or the like that enables the computer 301 to perform the functions of the production planning device 1 and so on according to the embodiments described above. The program need only contain the part of the instruction that calls an appropriate function (module) in a controlled manner to achieve a desired result. How the computer system 300 works is well known and the detailed descriptions thereof will be omitted.

In the above-described program, the step of transmitting information, the step of receiving information and so on do not include processing performed by hardware, for example, processing performed by a modem or an interface card in the step of transmitting (processing that can only be performed by hardware).

There may be a single or multiple computers executing the above-described program. That is to say, centralized processing or distributed processing may be performed.

Also, as a matter of course, in each of the above-described embodiments, two or more communication means that are present in one device may be physically realized using one medium.

Also, in the above-described embodiments, each kind of processing may be realized as centralized processing that is performed by a single device, or distributed processing that is performed by multiple devices.

As a matter of course, the present invention is not limited to the above-described embodiments, and various changes are possible, and such variations are also included within the scope of the present invention.

INDUSTRIAL APPLICABILITY

As described above, the production planning device 1 according to the present invention has the effect of being able to appropriately reschedule production tasks, and is useful, for example, as a server that schedules production tasks.

REFERENCE SIGNS LIST

A Information System
1 Production Planning Device
2 Terminal Device
11 Storage Unit
12 Acceptance Unit
13 Processing Unit
14 Output Unit
21 Terminal Storage Unit
22 Terminal Acceptance Unit
23 Terminal Processing Unit
24 Terminal Transmission Unit
25 Terminal Reception Unit 26 Terminal Output Unit
111 Task Management Unit
112 Schedule Management Unit
113 Rescheduling Condition Management Unit
114 Fixing Condition Management Unit
115 Special Condition Management Unit
121 Input Acceptance Unit
131 Scheduling Unit
132 Special Judgment Unit
133 Rescheduling Judgment Unit
134 Suspension Unit
135 Task Generation Unit
141 Schedule Output Unit

What is claimed is:

1. A manufacturing planning method that is realized using: a task management storage in which two or more pieces of task information each being information that specifies a manufacturing task for manufacturing at least one of a component of a finished product or a finished product and each corresponding to one or more task attribute values are stored, the manufacturing planning method comprising:
a scheduling step in which a processor executing a program performs scheduling processing to acquire schedule information that specifies a manufacturing schedule for the two or more pieces of task information based on the one or more task attribute values of each of the two or more pieces of task information;
a schedule output step in which the processor outputs the schedule information;
a first production step of manufacturing one or more components or one or more finished products according to the schedule information;
a rescheduling determination step, performed during the first production step, in which the processor determines whether or not a rescheduling condition is satisfied;
a second scheduling step in which the processor performs the scheduling processing again in a case where the processor determines that the rescheduling condition is satisfied;
a second schedule output step in which the processor outputs new schedule information that is a result of the scheduling processing performed again; and
a second production step of manufacturing one or more components or one or more finished products according to the new schedule information,
wherein the scheduling processing includes:
(i) a machine learning step of
performing machine learning processing on two or more pieces of training data employing the one or more task attribute values of each of the two or more pieces of task information as explanatory variables and schedule information that specifies an order of the two or more pieces of task information as an objective variable, to acquire a learning model,
providing the one or more task attribute values of each of the two or more pieces of task information to be scheduled and the learning model to a prediction module that performs machine learning prediction processing, and
executing the prediction module, thereby acquiring the schedule information, or
(ii) a score acquiring step of:
acquiring all combinations of task orders for the two or more pieces of task information,
acquiring aspect scores for each of the combinations, the aspect scores being acquired for two or more aspects,
acquiring a score based on the aspect scores, and
acquiring at least one combination having a highest score as acquiring the schedule information.

2. The manufacturing planning method according to claim 1, wherein the rescheduling condition is a condition that a period of time longer than or equal to a certain period of time has elapsed from a start of manufacturing, a condition that a period of time longer than a certain period of time has elapsed from the start of manufacturing, or a condition that predetermined information has been accepted.

3. The manufacturing planning method according to claim 1, wherein, in the second scheduling step, in a case where the processor determines that the rescheduling condition is satisfied, the processor fixes a schedule for one or more pieces of task information that satisfy a fixing condition, and acquires schedule information that specifies a manufacturing schedule for one or more pieces of task information that do not satisfy the fixing condition.

4. The manufacturing planning method according to claim 3, wherein the fixing condition is a static fixing condition that does not change dynamically.

5. The manufacturing planning method according to claim 3, wherein the fixing condition is a dynamic fixing condition that changes dynamically.

6. The manufacturing planning method according to claim 3, further comprising:
an input acceptance step in which the processor accepts input information from a user; and
a special determination step in which the processor determines whether or not the input information satisfies a special condition for judging whether or not to unfix a task,
wherein, in the second scheduling step, in a case where the processor determines that the special condition is satisfied, the processor performs the scheduling processing again on the two or more pieces of task information including one or more pieces of task information that satisfy the fixing condition.

7. The manufacturing planning method according to claim 1, further comprising:
an input acceptance step in which the processor accepts a suspension instruction corresponding to task information; and
a suspension step in which the processor performs suspension processing to suspend a task specified by the task information corresponding to the suspension instruction.

8. The manufacturing planning method according to claim 1, further comprising:
an input acceptance step in which the processor accepts an insertion instruction to insert task information into schedule information in which two or more pieces of task information are arranged; and
a task generation step in which the processor acquires one or more task attribute values of task information that is located before a position specified by the insertion instruction, acquires the task information corresponding to the one or more task attribute values, and inserts the task information into the schedule information.

9. The manufacturing planning method according to claim 1, wherein:
the scheduling processing includes (ii), and
a total number of the two or more pieces of task information is at least nine.

10. The manufacturing planning method according to claim 1, wherein:
the scheduling processing includes (ii), and a total number of the one or more task attribute values is at least six.

11. The manufacturing planning method according to claim 10, wherein the one or more task attribute values includes to a number of products to be manufactured, a color, information indicating whether a task is an express task, information on a jig, a deadline, and a number of workers working on the task.

\* \* \* \* \*